(12) United States Patent
Newell

(10) Patent No.: US 12,107,632 B1
(45) Date of Patent: Oct. 1, 2024

(54) METHODS, SYSTEMS, APPARATUSES, AND DEVICES FOR FACILITATING LIGHT BASED COMMUNICATIONS

(71) Applicant: Steven Wayne Newell, Milan, IL (US)

(72) Inventor: Steven Wayne Newell, Milan, IL (US)

(*) Notice: Subject to any disclaimer, the term of this patent is extended or adjusted under 35 U.S.C. 154(b) by 0 days.

(21) Appl. No.: 18/675,777

(22) Filed: May 28, 2024

(51) Int. Cl.
*H04B 10/11* (2013.01)
*H04B 10/516* (2013.01)

(52) U.S. Cl.
CPC .......... *H04B 10/516* (2013.01); *H04B 10/11* (2013.01)

(58) Field of Classification Search
CPC .............................. H04B 10/516; H04B 10/11
See application file for complete search history.

(56) References Cited

U.S. PATENT DOCUMENTS

| | | | |
|---|---|---|---|
| 4,025,759 A | 5/1977 | Scheffel | |
| 4,380,759 A | 4/1983 | Sulkoski et al. | |
| 5,045,833 A | 9/1991 | Smith | |
| 5,047,952 A | 9/1991 | Kramer et al. | |
| 8,525,673 B2* | 9/2013 | Tran | A61B 5/002 340/3.1 |
| 10,404,370 B1* | 9/2019 | Newell | H04B 10/114 |
| 10,411,431 B2* | 9/2019 | Houde-Walter | H04B 10/11 |
| 2008/0229089 A1* | 9/2008 | Assouad | H04L 63/08 713/2 |
| 2009/0325686 A1* | 12/2009 | Davis | G07F 17/32 463/25 |
| 2014/0178080 A1 | 6/2014 | Chen et al. | |
| 2014/0212143 A1* | 7/2014 | Ochiai | H04B 10/40 398/115 |
| 2015/0147067 A1 | 5/2015 | Ryan et al. | |
| 2015/0270903 A1* | 9/2015 | Goller | H04B 10/516 341/174 |
| 2017/0179677 A1* | 6/2017 | Thornes | G01J 11/00 |
| 2018/0006425 A1* | 1/2018 | Thornes | H01S 3/2333 |
| 2020/0177211 A1* | 6/2020 | Fazeli Chaghooshi | H03M 13/2933 |
| 2020/0274550 A1* | 8/2020 | St. John | H03M 7/6023 |
| 2020/0322047 A1* | 10/2020 | Barnett | H04B 10/1149 |

(Continued)

OTHER PUBLICATIONS

Browne, Tiffany, Orlando teen designs visor for the blind, wins gold, retrieved from Internet, Published on Mar. 24, 2024, <URL: https://www.clickorlando.com/news/local/2023/03/25/orlando-teen-designs-visor-for-the-blind-wins-gold/>.

(Continued)

*Primary Examiner* — Tanya T Motsinger

(57) ABSTRACT

An apparatus for facilitating light based communications includes a transceiver, a processing device, and a user interface device. The transceiver includes light emitters and a light receiver. The light emitters emit light. The light receiver is configured for detecting an incoming light signal. The processing device is operatively coupled with the transceiver. The processing device is configured for generating an incoming coded message based on the detecting, decoding the incoming coded message into an incoming message, provisioning the incoming message based on the decoding, obtaining an outgoing message, encoding the outgoing message based on the obtaining of the outgoing message, generating an encoded outgoing message based on the encoding, and generating a command for the transceiver based on the encoding of the encoded outgoing message. Further, at least one of the light emitters is configured for emitting an outgoing light signal based on the command.

17 Claims, 31 Drawing Sheets

(56) References Cited

U.S. PATENT DOCUMENTS

| | | | | |
|---|---|---|---|---|
| 2021/0067247 | A1* | 3/2021 | Liverman | H04B 10/1149 |
| 2021/0109285 | A1* | 4/2021 | Jiang | G02B 5/1866 |
| 2021/0399807 | A1* | 12/2021 | Dolgin | G02B 6/2773 |
| 2022/0385363 | A1* | 12/2022 | Gette | H04B 10/1125 |
| 2023/0291420 | A1* | 9/2023 | Liu | H04L 1/0075 |
| 2024/0080526 | A1* | 3/2024 | Martch | H04N 21/44008 |
| 2024/0187097 | A1* | 6/2024 | Ashrafi | H04B 10/541 |

OTHER PUBLICATIONS

Minotto, Alessandro, et al., Visible light communication with efficient far-red/near-infrared polymer light-emitting diodes, Light Sci Appl, 2020, vol. 9, No. 70, <URL: https://www.nature.com/articles/s41377-020-0314-z>.

Battelle Media Relations, Battelle RavenStar™ Antenna Technology Achieves Telecommunications Industry First at Famed VT-ARC Testing Site, retrieved from Internet, Published on Jan. 17, 2024, <URL: https://www.battelle.org/insights/newsroom/press-release-details/battelle-ravenstar--antenna-technology-achieves-telecommunications-industry-first-at-famed-vt-arc-testing-site>.

* cited by examiner

METHODS, SYSTEMS, APPARATUSES, AND DEVICES FOR FACILITATING LIGHT BASED COMMUNICATIONS

FIELD OF THE INVENTION

Generally, the present disclosure relates to the field of data processing. More specifically, the present disclosure relates to methods, systems, apparatuses, and devices for facilitating light based communications.

BACKGROUND OF THE INVENTION

The field of data processing is technologically important to several industries, business organizations, and/or individuals. In particular, the use of data processing is prevalent for facilitating light based communications.

Generally, people communicate with each other using communication devices such as mobile phones. Further, communication devices usually transfer data using microwave radiation. However, the use of microwave radiation may be unhealthy and might potentially impact human health.

Further, modern day technology uses binary coding for storing, processing and transferring data. The binary coding represents data using a two-symbol system and is machine-readable. However, binary code is not human readable. Further, the usage of binary code may not be versatile. Moreover, data streaming and processing performed using binary code in a critical situation such as in a combat situation may not be fast enough.

Generally, home base systems respond to users in either a visual or an audio output. Moreover, the range to receive an input signal using an input device such as a microphone is restricted to a small area. Further, users who are visually impaired may find it difficult to use home-based systems such as Homepod or Alexa.

Therefore, there is a need for improved methods, systems, apparatuses, and devices for facilitating light based communications that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating light based communications, in accordance with some embodiments. Accordingly, the apparatus may include at least one transceiver and a processing device. Further, the at least one transceiver may include a plurality of light emitters and at least one light receiver. Further, the plurality of light emitters emits a plurality of light. Further, the at least one light receiver may be configured for detecting at least one incoming light signal associated with at least one communication. Further, the processing device may be operatively coupled with the at least one transceiver. Further, the processing device may be configured for generating at least one incoming coded message based on the detecting. Further, the processing device may be configured for decoding the at least one incoming coded message into at least one incoming message using at least one coding scheme. Further, the processing device may be configured for provisioning the at least one incoming message based on the decoding. Further, the processing device may be configured for obtaining at least one outgoing message associated with the at least one communication. Further, the processing device may be configured for encoding the at least one outgoing message using the at least one coding scheme based on the obtaining of the at least one outgoing message. Further, the processing device may be configured for generating at least one encoded outgoing message based on the encoding. Further, the at least one encoded message may be comprised of a plurality of symbols. Further, the processing device may be configured for generating at least one command for the at least one transceiver based on the encoding of the at least one encoded outgoing message. Further, the at least one command may include at least one sequence for activating at least one of the plurality of light emitters. Further, at least one of the plurality of light emitters may be configured for emitting at least one outgoing light signal based on the at least one command.

Further, disclosed herein is an apparatus for facilitating light based communications, in accordance with some embodiments. Accordingly, the apparatus may include at least one transceiver, a processing device, and at least one user interface device. Further, the at least one transceiver may include a plurality of light emitters and at least one light receiver. Further, the plurality of light emitters emits a plurality of light. Further, the at least one light receiver may be configured for detecting at least one incoming light signal associated with at least one communication. Further, the processing device may be operatively coupled with the at least one transceiver. Further, the processing device may be configured for generating at least one incoming coded message based on the detecting. Further, the processing device may be configured for decoding the at least one incoming coded message into at least one incoming message using at least one coding scheme. Further, the processing device may be configured for provisioning the at least one incoming message based on the decoding. Further, the processing device may be configured for obtaining at least one outgoing message associated with the at least one communication. Further, the processing device may be configured for encoding the at least one outgoing message using the at least one coding scheme based on the obtaining of the at least one outgoing message. Further, the processing device may be configured for generating at least one encoded outgoing message based on the encoding. Further, the at least one encoded message may be comprised of a plurality of symbols. Further, the processing device may be configured for generating at least one command for the at least one transceiver based on the encoding of the at least one encoded outgoing message. Further, the at least one command may include at least one sequence for activating at least one of the plurality of light emitters. Further, at least one of the plurality of light emitters may be configured for emitting at least one outgoing light signal based on the at least one command. Further, the at least one user interface device may be communicatively coupled with the processing device. Further, the at least one user interface device may be configured for generating the at least one outgoing message associated with the at least one communication. Further, the obtaining of the at least one outgoing message may be based on the generating. Further, the at least one user interface device may be further configured for presenting the at least one incoming message. Further, the provisioning of the at least one incoming message may be further based on the presenting.

Further, disclosed herein is an apparatus for facilitating light based communications, in accordance with some embodiments. Accordingly, the apparatus may include at least one transceiver, a processing device, at least one user interface device, and at least one reader. Further, the at least one transceiver may include a plurality of light emitters and at least one light receiver. Further, the plurality of light emitters emits a plurality of light. Further, the at least one light receiver may be configured for detecting at least one incoming light signal associated with at least one communication. Further, the processing device may be operatively coupled with the at least one transceiver. Further, the processing device may be configured for generating at least one incoming coded message based on the detecting. Further, the processing device may be configured for decoding the at least one incoming coded message into at least one incoming message using at least one coding scheme. Further, the processing device may be configured for provisioning the at least one incoming message based on the decoding. Further, the processing device may be configured for obtaining at least one outgoing message associated with the at least one communication. Further, the processing device may be configured for encoding the at least one outgoing message using the at least one coding scheme based on the obtaining of the at least one outgoing message. Further, the processing device may be configured for generating at least one encoded outgoing message based on the encoding. Further, the at least one encoded message may be comprised of a plurality of symbols. Further, the processing device may be configured for generating at least one command for the at least one transceiver based on the encoding of the at least one encoded outgoing message. Further, the at least one command may include at least one sequence for activating at least one of the plurality of light emitters. Further, at least one of the plurality of light emitters may be configured for emitting at least one outgoing light signal based on the at least one command. Further, the at least one user interface device may be communicatively coupled with the processing device. Further, the at least one user interface device may be configured for generating the at least one outgoing message associated with the at least one communication. Further, the obtaining of the at least one outgoing message may be based on the generating. Further, the at least one user interface device may be further configured for presenting the at least one incoming message. Further, the provisioning of the at least one incoming message may be further based on the presenting. Further, the at least one reader may be configured for reading one or more structures of one or more neuron pathways in a gold-embossed microtissue slide associated with the apparatus.

Further, the processing device may be further configured for generating a unique authentication signature for the apparatus based on the reading. Further, the processing device may be further configured for appending the at least one outgoing message with the unique authentication signature based on the generating of the unique authentication signature. Further, the encoding of the at least one outgoing message may be further based on the appending.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
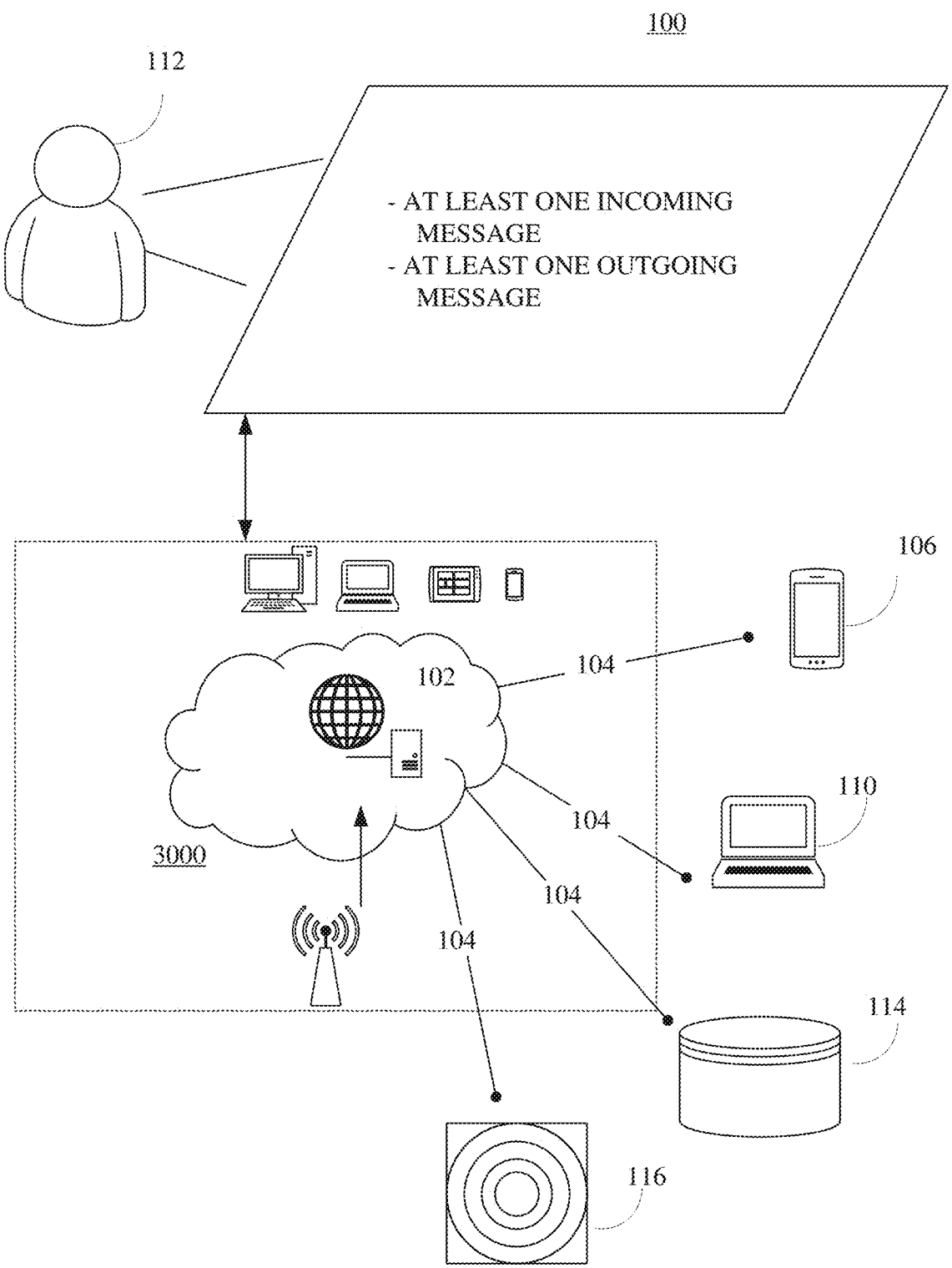
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating light based communications, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

While on sea duty, a visual signal system is often used for communication. A signalman often uses semaphore flags to convey a series of letters to another by extending his arms in various positions; the signal pattern resembles a clock face divided into 8 positions: up, down, out, high, and low for each of the left and right hands. Semaphore flags make an alphabet. Biochemists may use alphabet letters to abbreviate the names of amino acids used in building proteins. It is known, that three DNA codes define one amino acid. Nature uses tricodons to store information in DNA (deoxyribonucleic acid) and RNA (ribonucleic acid). As nature uses a path of least resistance while evolving toward efficiency, then possibly this explains why sequences of three are observed. The disclosed semaphore signal code specifically comprises two features, color and position effect.

Further, the present disclosure describes a code system as simple and exact as possible to improve efficiency. The code system comprises a plurality of switches. The plurality of switches may include a minimum of three switches. A fourth code may also be generated by simply putting all three key signals down at once together making a combined flash of all three frequencies as a fourth frequency that is the blend of the three at once.

Further, the present disclosure keeps the hardware modifications as simple as possible. The least frequently used word or processing detail, such as space between letters and words, punctuation marks, hyphens, and quotation marks as well as designating capitalization, may all be done by using Morse code at minimal signal energy used in signal sequences 'all keys down'.

Further, the present disclosure describes AI (Artificial Intelligence) as a top-down internet system which is risky on personal security issues. A way to keep rules for lawful conduct in the online experience is required. Further, ways are needed to take control when there are problems dealing with possibly unlawful hostile online activity. So, the present disclosure may provide a lower and higher AI brain organ system. Further, the lower and higher AI brain organ system may include an AI medulla and AI cerebrum which makes an AI version of Brain-Body Control.

Further, the AI version of Brain-Body Control may comprise one AI team focused on functions applied as the medulla (lower brain) which regulates and responds to the protection of the body. A Homebase AI Server System may specialize in the kind of AI it includes to function as the AI medulla (lower brain). Further, the AI version of Brain-Body Control may comprise another AI team focused on control of decent conduct in behavior to control communication, language processing, and non-violent media during socializing, as the functions of AI cerebral.

Further, the Homebase AI Server System may be named as Modular Deducer. Further, the Homebase AI Server System may comprise an instinctual intelligence. Further, the instinctual intelligence may be used for one or more of the following fire alarms, medic alerts, HVAC (High Voltage Alternating Current) system fail, power out, weather alerts, heart attacks, strokes, and call 911. Further, the Homebase AI Server System is internet-connected but the command dashboard is only controlled by the IFR (Infra-Red) signal from the cerebrum AI organ by the owner.

Further, the present disclosure describes a mobile AI unit for personal control. Further, the Homebase security and maintenance like the medulla of the human brain obeys the will of the higher brain organ, called as Mediator Device. A 3-frequency light signal may be installed and individually encrypted at set-up synchronizing the owner Mediator with the Modular Deducer. Further, the installation may use variance encryption so each home is unique.

Further, the present disclosure discloses a system configured for lowering daily RF (Radio Frequency) radiation exposure. Further, the mobile unit (Mediator) may have two signal units. Further, one of the units is configured to be carried on as a necklace or headband, bracelet, or glasses, by streaming an IFR signal so no microwave radiation is close to the skin in daily use. Further, set the device APN (Access Point Name) on the Wi-Fi Hotspot device to on, and the IFR signal receiver on the Mobile Wi-Fi Hotspot will stream the Mediator IFR signal in RF as interfaced using the Mediator. The hotspot is a line of sight to the Mediator, with no skin contact with the RF antenna.

Further, the present disclosure discloses a method for controlling two AI-synchronized units. Once the set-up is authenticated on the Homebase, the IFR calibration individualizing frequency defaults and encryption variance pattern is done at start-up. Further, synchronizing this specific set-up is a 3-frequency "fingerprint" in this default online security setting of this Mediator and Modular Deducer personally licensed internet gateway. Only the Mediator IFR of the user Key code can change the core OS (Operating System) secure setting of the Homebase, or modify Hotspot defaults.

Further, the present disclosure provides indications for the human reading of code. The middle finger points to the Red key, the pointing finger points to the Blue key, and the thumb points to the Green key. Further, the stage right indicates Red, the stage left indicates Green, and the top indicates Blue.

Further, disclosed is an installation process for the humanly installed unit setup of the mediator camera randomness light refraction event. After the Modular Deducer installation begins, the Mediator will instruct the User to follow a sequence of events to organize the unique encryption setting event of the installation. Further, focus the camera on the initiation code block that might be associated with the camera of the Mediator and the AI Homebase of the Modular Deducer and Wi-Fi Hotspot. It will signal in three blue flashes on the Mediator that it is ready to run the program for the calibration of the encryption. Further, place the shaken sparkly snow globe on its mount before the camera lens allowing it to settle slowly the shaken glitter swirls in the snow globe until the activated camera on the Mediator flashes three green signals with a beep. The Mediator will signal for confirmation of this setup camera recording. All done installing the unique IFR frequency variance of the user's personally secure encrypted Mediator and Modular Deducer AI-supported smart home and mobile internet interface. If the Hotspot is away from the Mediator longer than 2 minutes it will warn. After 4 minutes it will Wi-Fi call Homebase GPS (Global Positioning System) location/time lost. After 20 minutes it will depending on the default security setup dial 911 for the user.

Further, the mediator microphone may be configured to translate the user's words to IFR signals. The IFR signal from Mediator to either the Homebase AI server in the home functioning as the file storage documents archive, home security, medical alert, and home maintenance Smart Home system, can channel online. Further, the mobile Wi-Fi hotspot kept with the Mediator may receive an IFR streaming signal from the online interface at home or connected on the go, yet no skin contact to microwave radiation antenna signals like current devices.

Further, the present disclosure describes a night mode of the disclosed system. A secondary system of three-frequency signal streaming interfaces does not have to be as it might look. The 3 colors of red, blue, and green light are used in some modes, but any 3 frequencies in the EM (Electromagnetic) spectrum may work. At night the AI will automatically rely more on ultrasound frequencies if the IFR line of sight is not working. So if an elderly person wears their Mediator bracelet or necklace or headband, the medic alert sensor works by sound to an audio sensor on the bed stand as needed.

Further, the present disclosure describes faster, energy-efficient, and safer AI tools. This begins a new era in the lifestyle of using online interfaces, giving safe lower microwave radiation exposure and faster data processing that is more energy efficient, in an AI-connected system like the Central Nervous System, which may have specialized intelligence organs. The system works with augmented reality resources, intimately empowering daily lives with greater physical and mental security in a way that keeps AI settings to the user's choice. Further, the 3-frequency based data streaming IFR signal provides faster data streaming, more energy efficiency in data streaming volume, and an architecture made for greater in-home personal security control of smart home and mobile internet.

The disclosed system provides increased energy efficiency in data streaming while reducing radiation exposure that damages genetic code in the body's cells, risking cancer and illness, is a basic practical goal in cyber-technology development. Further, by making an IFR laser light signal data streaming system with an aperture that can send a signal spread in the direction of the gaze of the user of the Mediator Device, the goal is to use behavioral instinct with cyber-technology. Humans will relate easily to a device that they can understand to focus detection and speaking much like humans do with their bicameral eyesight and hearing with our ears. Disclosed is the headset, a single signal output like a "third eye" to send the IFR communication much like speaking from the mouth, and two apertures over the temples, much like IFR signal ears that may directionally sense the speaking IFR of the Mediator Device from a recognized other user. This could also be a way to detect LiDAR (Light Detection and Ranging) reflection of the object reality around the head of the user, also instinctually understood much like having two ears that directionally detect in hearing. The practical idea is to use the already evolved neurology of human anatomy and simply enhance it with cyber-technology.

Further, one of the key details in the concept is that the eyes and ears work and the voice speaks but the whole thing is by a link to the brain. This is called the Modular Deducer and it is a whole separate unit, and light signal streaming between that unit and the Mediator Device is what hooks up to the internet such as it has that working now. Further, the Modular Deducer may be simply software in a laptop tablet, or smartphone that is put on "airplane mode" and not signaling in microwave radiation. A major goal is to get RF radiation away from the human body. The concept here is the Mediator Device may have a standard plug for a stereo headphone type connection that may go to the other device or even just to a stereo earphone piece for sound. The main thing is the IFR signal between Mediator Devices, and in the IFR-based network modules posted in ceiling room corners and the "disco-ball" in the center of the room, all for IFR light signal refraction distribution, or in a shopping mall store with ceiling rail mounts over the rows of the aisles again facilitating IFR light signal refracting and distribution of communications to Mediator Device users there looking for information. So the Mediator Device may be simply a transceiver in an IFR signaling internet LAN (Local Area Network), or it may be talking through a dedicated Modular Deducer that is posted in the home of the user and it may be AI smart to the needs of that user on a daily routine basis.

Further, the present disclosure describes a new kind of memory chip being researched and it uses light-based refraction as a tool for data storage, which is much less energy-consuming as a data-streaming information processing system for memory.

Further, a new urgency is there to deploy an IFR-based data streaming wireless device interface even if it is not fully the kind of new AI-enhanced eyes, ears, and voice of full-scale Mediator Device. The impact of the onset of Havana Syndrome emphasizes the ongoing risk to health that microwave radiation plays in the current normally designed and industrially utilized wireless microwave signal devices. It further validates the significance of developing and making available an IFR-based signal system of an interface wireless handheld device that may stream by IFR light signal and possibly back up sonar signal ultrasound depending on conditions for a three-signal high-efficiency energy use data streaming technology to replace dangerous and toxic RF based microwave radiation signal as a system to talk to the local dedicated Server linked to the internet.

Further, the present disclosure describes that the Modular Deducer as a device may be a headband worn communication amulet for the human form, but this same module may be the eyes and ears and speaking apparatus of the Server also, which in general is called the Modular Deducer. The main module of the Modular Deducer may be mobile and able to walk around and may be shaped like a humanoid robot, it would still have a communication system on the head that is much the same as the headband unit being worn by people. Further, the Modular Deducer system using the Mediator Device may simply be a computer unit attached to a Mediator Device. It is the "Bio-SIM" chip that makes an individual out of any Modular Deducer. This may come from the same kind of process used to research brain disease and brain growth and development with electron microscopes using dried wafers of mouse brain embossed in an ionization vacuum chamber with gold ions in a process that takes a day to complete on that very small brain sample made into a unique kind of brain tissue electron microscope signal refracting material for study. This could also be used to be the unique pattern signal chip to identify a computer system as a single module in a network.

Further, "Three frequency signal distribution receiver data-input mediator device to server computer processor" is only the signal in the part of the "Mediator Universal LAN Communicator" because the whole concept is a means of enhanced AI technology to our eyes and ears and capacity to speak to each other, which is both in real physical chemistry world of our organic body in the environment, but also and simultaneously where it is adaptive, also in cyberspace with data-streaming of information. This is nothing different than a "smartphone" however it works by a completely different mode of signal conveyance and is both faster and more energy efficient because IFR signal uses less radiation energy in a frequency level that has molecular biology damaging impact, and also will use less from any energy supply system economically. Two goals in the proof of concept, are no microwave radiation to a level to speak of compared to current commonly used RF signal Wi-Fi devices, and second is that generally discrete multiple light frequency laser signals that may convey three switch flops like red, red, green, the same information as eight switch flops of zero, one, one, zero, zero, zero, zero, one. The problem with the RF signal is the distribution of the readable signal in the radius from the signal antenna diminishes with distance so power supply in radio towers of intense power is the solution.

Further, the disclosed system may be a multi-mode device and it may switch to a silent position effect visual reading by human eyesight upon the forehead triangle when that kind of night time audio signal stealth silence is needed, and only the flip-down ocular of the signal receiver user would be able to follow the encryption to be able to through their ocular see those position-effect triangle sides sequences with the skill of their training to decipher what the sending person is saying in the "light-whisper" of the adhesive electrode mouth and tongue movements being detected, analyzed by the onboard computer of the sender device user, which has been translated into the three side position-effect pattern for the receiver of the message to visually totally silently and without any RF signal across the distance between them to read the instructions of the sender.

Further, the present disclosure describes Trigram Biochrysalis Encryption Chip Hardware Technology, the new AI version SIM (Subscriber Identity Module) identity control of the bootstrap on the new AI technology of the Modular Deducer. This is a technology for a unique neurological development architecture as an information theory geometric pattern sample in bio-fractile template design facilitating the encryption as a kind of identity "fingerprint" utility as the "Biochrysalis" of the artificial intelligence system identification. So then, this may be a specific utility in information theory which is made using a sample of biological tissue as a unique identity signature foundational to all else in the large data learning models processing from an individual module of an artificial general intelligence operating device functioning as a "Server" system for internet traffic access and management to the user of a Mediator Device working with trigram data parcels of information technology, this is what is the encryption and System within the system admin folder. It controls the config-pol and thereby the contents file for user-data and system-data to administer the system policies.

Further, the present disclosure describes a new kind of SIM. The "Biochrysalis" is a new encryption utility using unique signal refraction architecture of an electron micrograph of a gold-embossed micro-tissue slide of a mouse brain, as an authentication signature to complete the bootstrap and implement the config-pol for authorization of the activation of the system configuration of this individual artificial intelligence module privately owned by this Mediator Device user as their Modular Deducer gateway server to the internet using the AI technology they have deployed for their own best results.

Further, the present disclosure describes Light-based signal encryption by the laws of physics in light. "The three-legged stool" approach to encryption relies on the impossibility of the three objects problem in relativity. So then, for the third leg of the stool, which is the use of timestamp upon the relative movement of the two axes of the data planet day-spin and the annual axis wobble of orbit, is added the timestamp of the origin point in time that the algorithm authenticated to license registration for that motherboard operating system. It is apparent to the AI entity that a data streaming system would give faster reflexes in the machines for the robot Olympics.

Further, the time reference verification filter is obtained by using the two-slit experiment as a physical constant in light using the ultraviolent conundrum as the key stability factor that can prove the exact source signal authentication in time between the source signal made at the home base generating that signal and the pattern detected not as a hacked hallucination by the receiving AI, but verified as a match in a quickly timed verification data parcel sent through the internet between sending Server unit Modular Deducer and the receiving Server unit Modular Deducer. There is by the laws of physics in light particle or wave reference to the predictable pattern known to the double slit experiment, no possible way for a hacking data signal physically to create a hallucination of the actual message sent by the source light beam of the message in this data authentication radio-silent system.

As long as the time stamp reference is correct, at the speed of light the pattern in the record of the double slit experiment from the Laser beam split knife to the double slit experiment pattern definition made by the sending Modular Deducer will verify in nanoseconds over the internet communication channel between the pitcher that is the sending server of a Modular Deducer as the pitcher and the receiving server of that other Modular Deducer that is the catcher. It is a discrete physical event in the physics of light and the encryption cannot be traced or calculated because of the impossibility of solving the three-object problem between the first object in this algorithm, the day-axis spin of the planet of data signal sending and the second being the annual orbital data planet wobble of this data planet signal algorithm, with finally the variable of time in orbit of the planet since it first formed into orbit. Three objects in relativity signifying a unique physical position in space-time in the constants of this universe are the basis of encryption of signal in my light-based data streaming system of security. Further, AI technology is the main link in the detail of how the revision in design from the way the "tablet" and the "smartphone" screen works to the way the Mediator is to work.

This along with the item "Biochrysalis" or "fingerprint" unique to a gold embossed slide print of a micro-graphed structure of the freeze-dried microscopically sliced murine brain as a unique licensing authentication chip for the identity of the Modular Deducer and matched Mediator Device each having a corresponding bio-fractile half of that micro-slice wafer of freeze-dried gold embossed murine brain encased in glass, makes each pair of a server system Modular Deducer AI with the licensed Modular Deducer AI unit to be a unique two-part operating system, physically separated but operationally coupled in an unbreakable pairing as unique of definition as the individual DNA code of one mammal body reproductively generated naturally.

Further, the position in the information processing of the synchronized frequency variance information signal security authentication protocol by the Buckminsterfullerene spinning light refraction crystal unit doesn't have to be systematically onboard the Mediator Device headband unit. It could be for the sake of economics in the production of these bicameral units, placed in the Modular Deducer unit, where the in/out signal is processed. It just seems more secure having that distinctly electromechanical synchronized signal variance security authentication of the signal by AI analytics of the pattern detection in a double slit experiment pattern-detector where the signal generation cannot be "hacked" by something interfacing from connections in support from the regular internet Further, the present disclosure describes a hand-clasp as a random 36 signals in 12 trigrams based on a time schedule. Further, the server Modular Device synchs with the mediator. Further, the lighthouse "MD" controls the schedule.

Further, the present disclosure describes a 2 rotations mechanism and the time of license authentication as a $3^{rd}$ variable for the time identity signature of a duo of a Mediator Device and a server's Modular Deducer. Further, the present disclosure describes a virtual synched to real; a global rotation pendulum for the Data-Day schedule signature variation as an example of an apparatus for the time identity signature. Further, the present disclosure describes a quartz crystal watch dial for an electromechanical signature variance Data-Year as another example of an apparatus for the time identity signature.

Further, the present disclosure describes the use of a calibration set for these two mechanisms of a unique rotation cycle of the light refraction pattern of the unique spinning glass crystal globe. Detect the unique signal of the ID pattern anticipated to be found from all background signal noise by looking for it in the pattern of the double slit experiment results. Further, the results almost have to be a data signal in light so that it secures data transfer.

Further, the present disclosure describes a Light-Whisperer "Sideburns" module configured to fold down on a headband based on requirement.

Further, the present disclosure describes a holographic visor for facilitating augmented reality in the field. Further, the holographic visor may be folded down from the headband based on the requirement of the interface with the internet while moving anywhere in the field.

Further, the present disclosure describes a wireless crystal ball device configured to link with the Mediator Device in the field if IFR support signal LAN networking in the field is not available. Further, stores and shopping malls may install IFR signal array units configured to send and receive signals on the ceilings over shopping ailes.

Further, the present disclosure describes a new IFR based Mediator Device for enhanced reality mobile device utility.

Further, the present disclosure emphasizes a phased-in mode of IFR based code devices by downloading an application on smartphones configured for enabling wireless support called the "Crystal Ball" unit. Further, the application is configured for providing internet mobility access to Mediator IFR interface when it is away from the server Mediator Device in the living room of the house.

FIG. 1 is an illustration of an online platform 100 consistent with various embodiments of the present disclosure. By way of non-limiting example, the online platform 100 to facilitate communication may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, and an apparatus 118 (such as an apparatus 200, an apparatus 300, an apparatus 1900, an apparatus 2700, an apparatus 3100, etc.) over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 3000.

Figure 2:
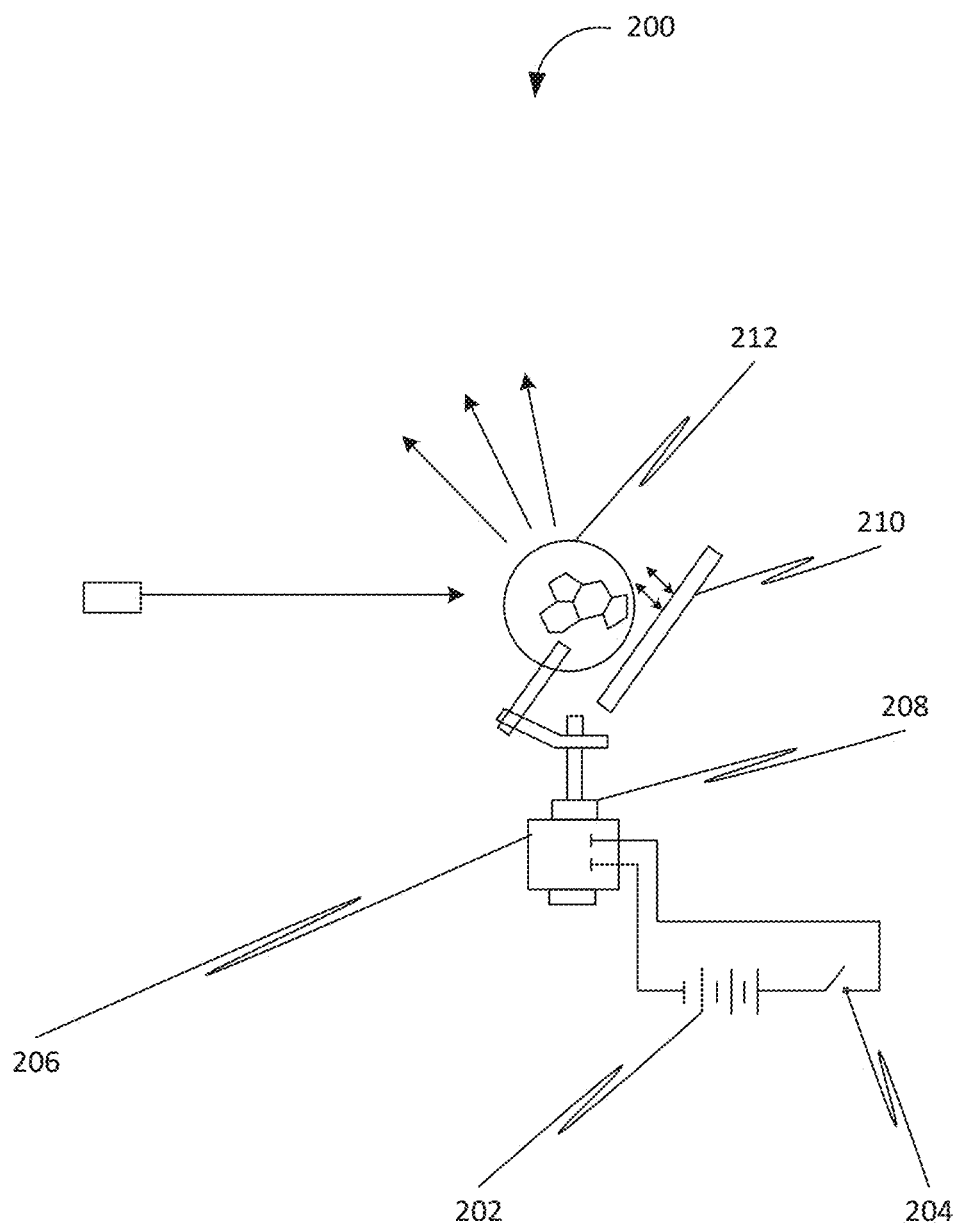
FIG. 2 is a perspective view of an apparatus 200 for facilitating light based communications, in accordance with some embodiments.

FIG. 2 is a perspective view of an apparatus 200 for facilitating light based communications, in accordance with some embodiments. Accordingly, the apparatus 200 may include a battery 202, a switch 204, an electric motor 206, a spinning and oscillating mechanism 208, a mirror 210, and a buckminsterfullerene ball glass crystal light refractor 212.

Further, the battery 202 may be electrically coupled with the switch 204. Further, the battery 202 may be configured for powering the electric motor 206. Further, the battery 202 may include AAA batteries, Lithium Ion batteries, etc.

Further, the electric motor 206 may be mechanically coupled with the spinning and oscillating mechanism 208. Further, the electric motor 206 may be configured to provide mechanical power to the spinning and oscillating mechanism 208 based on the powering. Further, the electric motor 206 may include a servo motor, a stepper motor, etc. Further, the spinning and oscillating mechanism 208 may include a rotatory shaft, a rotatory bearing, etc. connected to the electric motor 206.

Further, the spinning and oscillating mechanism 208 may be mechanically coupled with the buckminsterfullerene ball glass crystal light refractor 212. Further, the buckminsterfullerene ball glass crystal light refractor 212 may include buckminsterfullerene crystal configured for refracting light. Further, the spinning and oscillating mechanism 208 may be configured for spinning the buckminsterfullerene ball glass crystal light refractor 212 based on the mechanical power provided.

Further, the mirror 210 may be configured for receiving a controlled frequency laser light signal from at least one device configured for transmitting the controlled frequency laser light signal. Further, the controlled frequency laser light signal may include a beam of light. Further, the mirror 210 may be configured for reflecting the controlled frequency laser light signal based on the receiving.

Further, the buckminsterfullerene ball glass crystal light refractor 212 may be configured for distributing the controlled frequency laser light to multiple angles based on the receiving and reflecting.

Further, the buckminsterfullerene mineral contaminated glass crystal globes of signal distribution functions in three tiny light refraction signal spreaders function in the Mediator Device as a uniquely identifiable programming signal identity in a Solar System Wide Web. The polarized light glass crystal filter only allows the illumination of the symbol slant. If the frequency of light shining through the elemental chemistry product right from the elemental chemistry product light from the tested sample shows a frequency for that color. Consider the buckminsterfullerene mineral-contaminated glass crystal globes as a miniature planet. It is the data planet unique to that humankind user as an individual node identity in the AI system of this Solar System Wide Web. The "planet" spinning may have two defining rotational aspects that may be collected in the data plane that functions in this system of the Server systems with only one Server linked to the activation code of this unique operating Mediator Device. On the total data set of this two dimension data plane, this individual data planet may have an algorithm designed in a time sequence that started at the date, hour, second, and one-thousandth of a second that is the signature of that individual activation and the "third leg" of the data structure stool of the encryption that operates for the continued unique identity of this particular humankind user of this personally linked Mediator Device. The biorhythm data of that humankind user associates data of geographical location, movement history, and user data to improve personal identification of that node in the Solar System Wide Web. The other two "legs of the stool" of this data structure defining this "data-planet" to this humankind user may be the rate of spin of the "day" of that "data-planet" and the rate of spin of the "axis-wobble" of that "data-planet" that spins refracting a laser light signal distribution data streaming pattern in a twice repeated three signal sequence of the letter of the "Azureakandt" code light signal alphabet.

Three legs to this encryption stool to make the signature data reference possible to the "Modular Deducer" AI agent in the Solar System Wide Web, uniquely attending to the data-plane of function associated with this humankind user of an individually identified Mediator Device, having a specific date, timestamp of the activation code in the Solar System Wide Web, (hereinafter aka the 2SW,) and also the algorithm of the spin of the global day and the rate of the spin of the axis-wobble of the globe of that red, green or blue mineral contaminated glass crystal refracting the laser light in a signal distribution light spray from that Mediator Device communicating with the receivers of other Mediator Devices in the 2SW. Three legs to the encryption data structure of the individual Mediator Device may include time, spin of the day, and spin of the wobble in the axis of the data-planet that is each of these three tiny spinning Buckminsterfullerene glass crystal balls.

Figure 16:
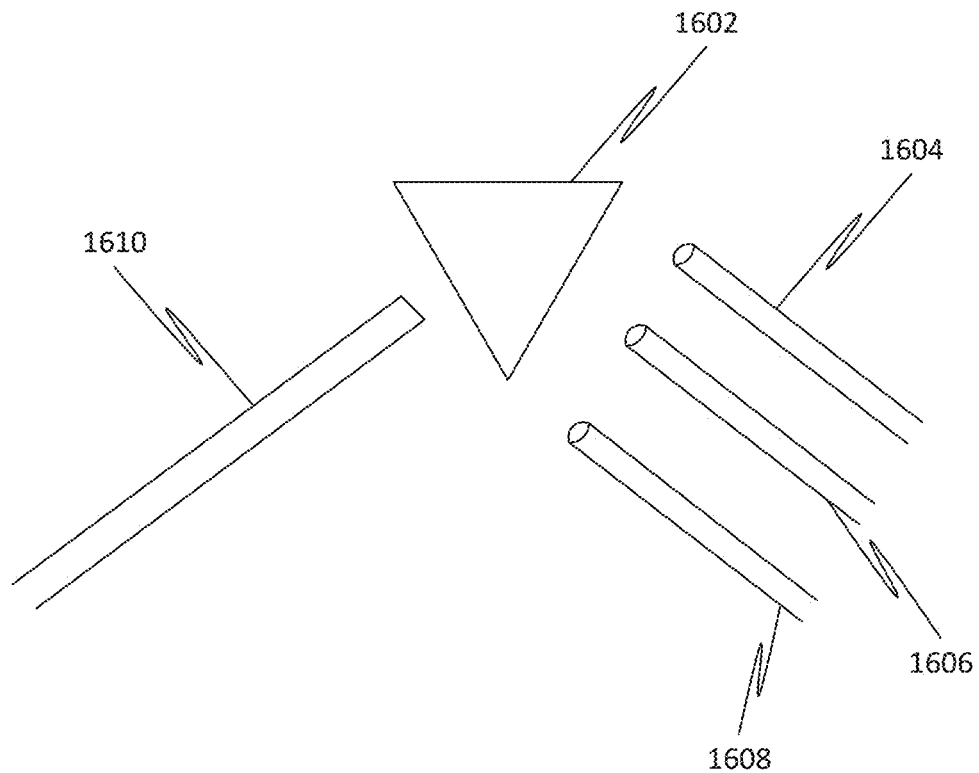
FIG. 16 is an illustration of at least one component of the apparatus 300 for facilitating light based communications, in accordance with some embodiments.

Further, in some embodiments, the apparatus 200 may include a glass prism 1602, a plurality of photo detectors 1604-1608, and a fiber optic wire 1610, as shown in FIG. 16. Further, the glass prism 1602 may be configured for separating a plurality of colors from an input frequency. Further, the plurality of photo detectors 1604-1608 may include a photo detector 1604 configured for detecting blue color, a photo detector 1606 configured for detecting green color, and a photo detector 1606 configured for detecting red light.

Figure 3:
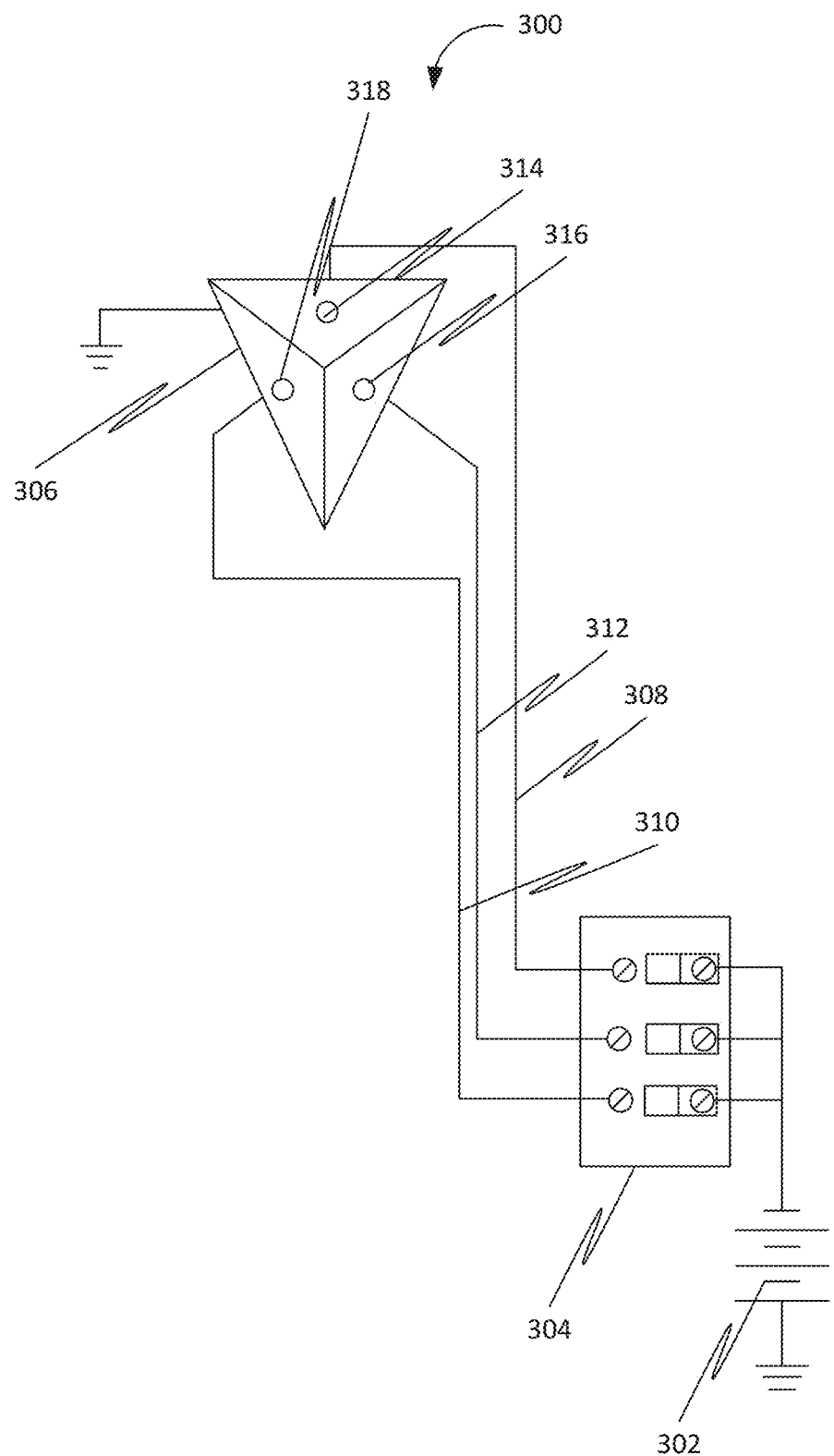
FIG. 3 is an illustration of an apparatus 300 for facilitating light based communications, in accordance with some embodiments.

FIG. 3 is an illustration of an apparatus 300 for facilitating light based communications, in accordance with some embodiments. Accordingly, the apparatus 300 may include a battery 302, a plurality of switches 304, at least one signaling device (mediator device) 306, and a plurality of telephone wires 308-312.

Further, the battery 302 may be electrically coupled with the plurality of switches 304. Further, the battery 302 may include AAA batteries, AA batteries, etc. Further, the battery 302 may be of capacity 6 volts. Further, the battery 302 may be of lantern type. Further, the plurality of switches 304 may comprise two states. Further, the two states may include an on-stage and an off-stage. Further, the battery 302 may be configured for powering the at least one signaling device 306. Further, the plurality of switches 304 may comprise 6 screws/bolts of size ¾", a plywood of size 3"×5"×0.5", and 3 touch-plates made of a little sand papered flaps of beer can.

Further, the plurality of switches 304 may be electrically coupled with the plurality of telephone wires 308-312. Further, the plurality of switches 304 may include toggle switches, push button switches, etc. Further, the plurality of telephone wires 308-312 may include co-axial cables, drop cables, etc. Further, the plurality of telephone wires 308-312 may be electrically coupled with the at least one signaling device 306. Further, the plurality of telephone wires 308-312 may be configured for transmitting a plurality of electrical signals to the at least one signaling device 306 from the plurality of switches 304. Further, the plurality of electrical signals may include periodic signals, sinusoidal signals, etc.

Further, the powering of the at least one signaling device 306 may be based on the state of the plurality of switches 304.

Further, the at least one signaling device 306 may be configured for generating a plurality of signals based on the powering of the at least one signaling device 306. Further, the at least one signaling device 306 may include a plurality of lighting elements 314-318. Further, the plurality of lighting elements 314-318 may include light-emitting diodes, halogen bulbs, etc. Further, each of the plurality of lighting elements 314-318 may be configured for generating light corresponding to a frequency in the electromagnetic spectrum. Further, the plurality of lighting elements 314-318 may be of capacity 3-1.5 watts. Further, the plurality of lighting elements may be a type of flashlight bulb. Further, the lighting element 314 may correspond to a frequency of color blue. Further, the lighting element 316 may correspond to a frequency of color green. Further, the lighting element 318 may correspond to a frequency of color red. Further, the generating of the plurality of signals may be based on the generating of light. Further, the generating of the light may be based on the permutation of the state of the plurality of switches 304.

Further, the apparatus 300 may include a scope tube. Further, the scope tube may be configured for facilitating light based communications at night during covert operations, so only the party being addressed can see.

Figure 4:
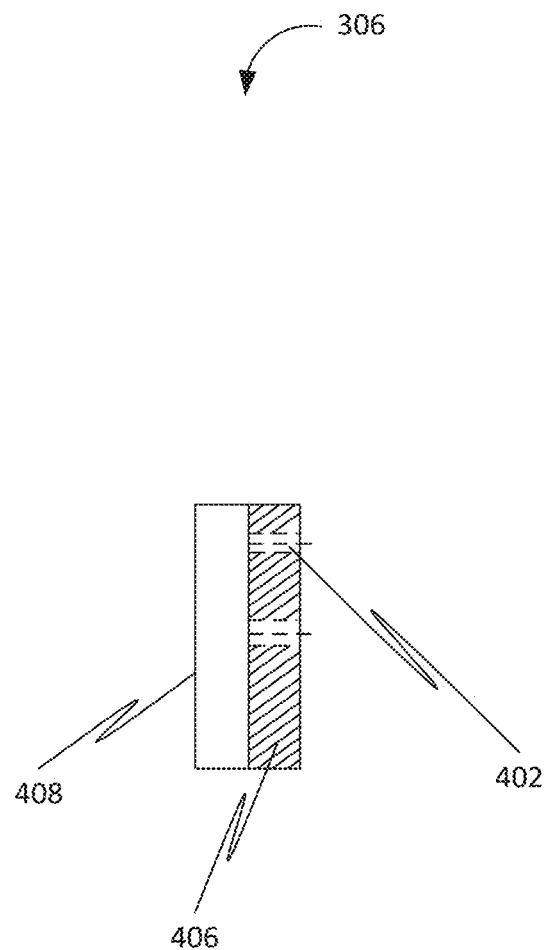
FIG. 4 is a side view of the at least one signaling device 306 for facilitating light based communications, in accordance with some embodiments.

FIG. 4 is a side view of the at least one signaling device 306 for facilitating light based communications, in accordance with some embodiments. Accordingly, the at least one signaling device 306 may include a hole for a blue flash light bulb 402, two holes across for green and red flash light 502-504, a balsa wood base 406, and a colored glass top 408.

Figure 5:
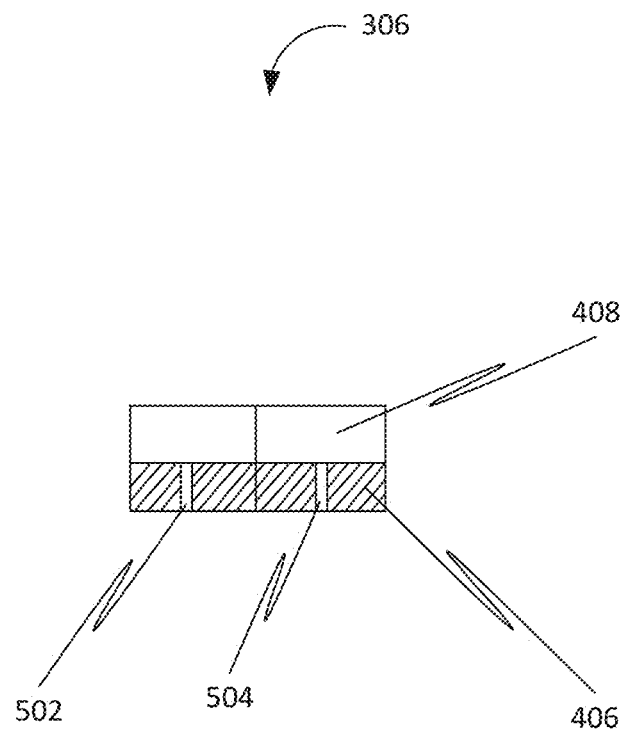
FIG. 5 is a bottom view of the at least one signaling device 306 for facilitating light based communications, in accordance with some embodiments.

FIG. 5 is a bottom view of the at least one signaling device 306 for facilitating light based communications, in accordance with some embodiments.

Figure 6:
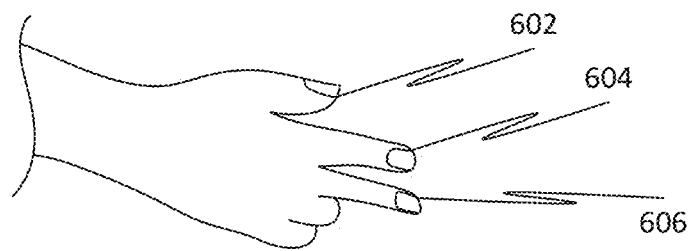
FIG. 6 is an illustration of a code system for facilitating light based communications, in accordance with some embodiments.

FIG. 6 is an illustration of a code system for facilitating light based communications, in accordance with some embodiments. Accordingly, the code system may include a thumb 602 as a symbol for blue light on, a pointing finger 604 as a symbol for green light on, and a middle FIG. 606 as a symbol for red light on.

Figure 7:
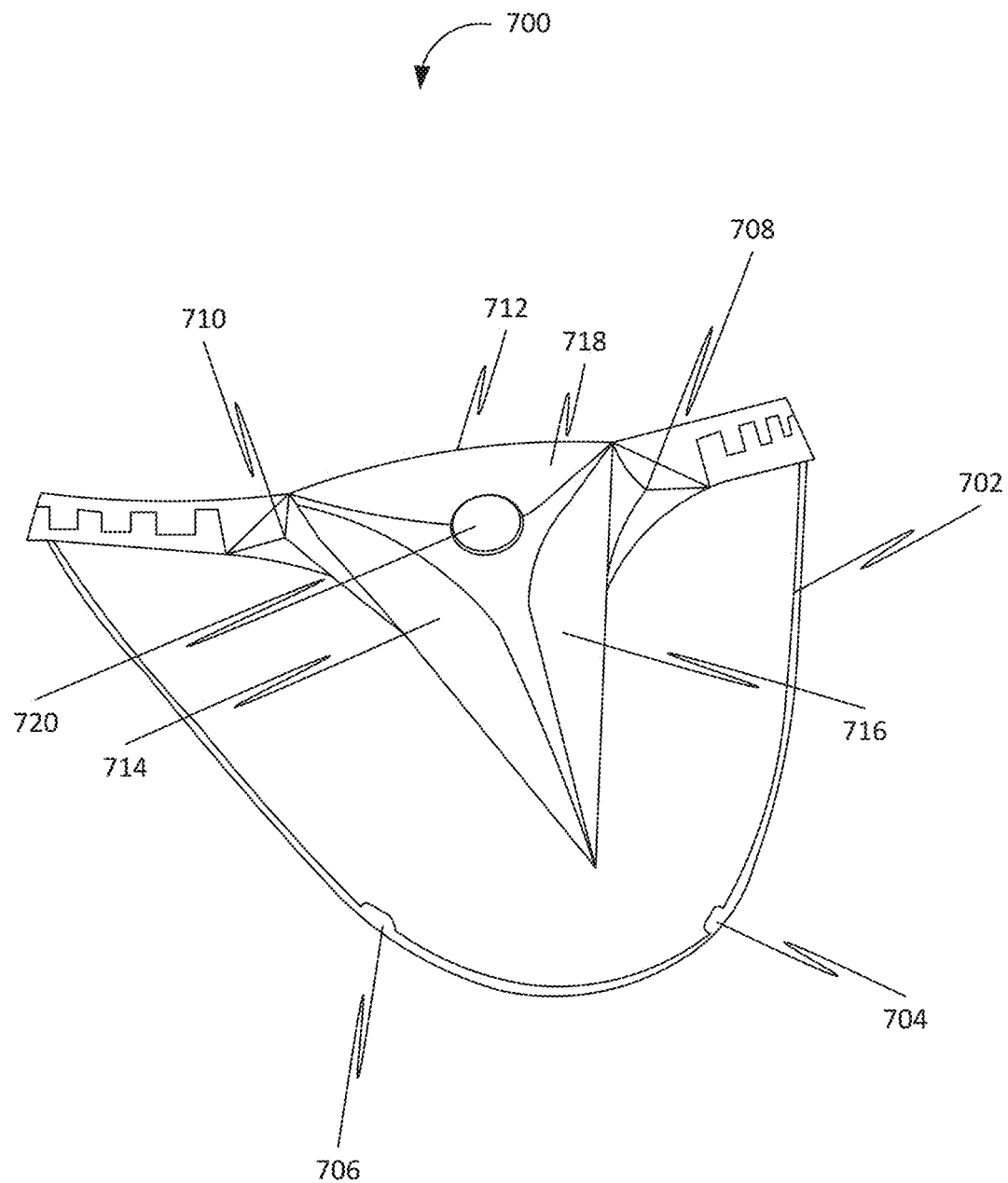
FIG. 7 is an illustration of an apparatus 700 for facilitating light based communications, in accordance with some embodiments.

FIG. 7 is an illustration of an apparatus 700 for facilitating light based communications, in accordance with some embodiments. Accordingly, the apparatus 700 may include a light whisperer chin strap sublingual movement sensor 702, a plurality of skin electrode Sensors 704-706, a stage left light "ear" 708, a stage right light "ear" 710, and at least one signaling device (mediator device) 712.

Further, the light whisperer chin strap sublingual movement sensor 702, may be configured for detecting a movement. Further, the plurality of skin electrode Sensors 704-706 may be configured for detecting movements of eyebrows. Further, the at least one signaling device 712 may include a space 714 for generating a red signal, a space 716 for generating a green signal, a space 718 for generating a blue signal, and a space 720 for generating a flash signal. Further, the stage left light "ear" 708 and the stage right light "ear" 710 may be configured for adjusting the apparatus 700 on the forehead.

Further, in some embodiments, a sensory system may be associated with the mediator device. Further, the sensory system may include a skin contact sensor. Further, the skin contact sensor may be mounted secretly as an alternative means in an emergency to code in trigram signals by placing a wristwatch on the forehead skin of the user's face. Cathode and anode electrode contacts may be placed 1.5 inches apart on the dial surface of the wristwatch to detect movements of the eyebrows. The red light can be emitted by making the right eyebrow down, the green light can be emitted by scrunching eyebrows together to move the left eyebrow and the blue light can be emitted by moving the right eyebrow up. The "Flash" can be emitted by grimacing the upper lip up toward the nostrils. Further, the flash can be used for punctuations and spaces between letters defined by the trigrams. Signal out is Blue, Red, Green emitter, and all three flash center spot.

Figure 8:
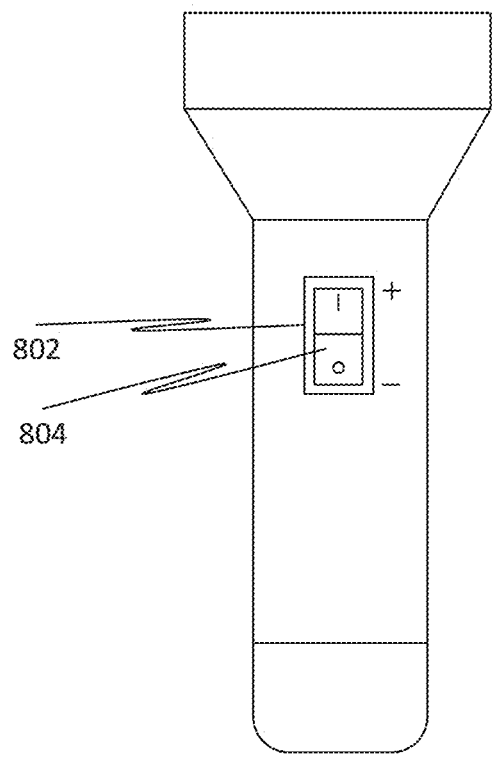
FIG. 8 is an illustration of the apparatus 300 for facilitating light based communications, in accordance with some embodiments.

FIG. 8 is an illustration of the apparatus 300 for facilitating light based communications, in accordance with some embodiments. Accordingly, the apparatus 300 may comprise a contact plate 802 and a touch-plate control switch unit 804. Further, the contact plate 802 may be electrically coupled with a top wire from the bottom.

Further, in some embodiments, a wire may be used to soldier top wire to contact plate bottom of touch-plate control switch unit of the mediator device.

Figure 9:
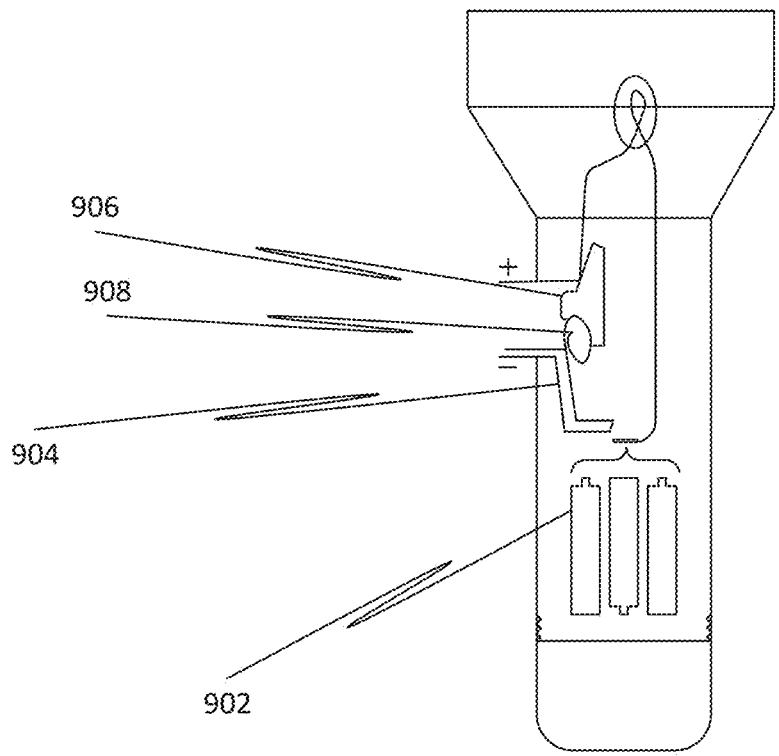
FIG. 9 is an illustration of the apparatus 300 for facilitating light based communications, in accordance with some embodiments.

FIG. 9 is an illustration of the apparatus 300 for facilitating light based communications, in accordance with some embodiments. Accordingly, the apparatus 300 may include a plurality of AAA batteries 902, a contact plate 904, a switch cover 906, and a soft wire loop 908.

Further, the contact plate 904 may be fabricated with tin can metal from the bottom. Further, the switch cover 906 may be configured for holding an upper wire. Further, the switch cover 906 may be comprised of soft plastic. Further, the soft wire loop 908 may be configured for stabilizing the contact plate 904.

Figure 10:
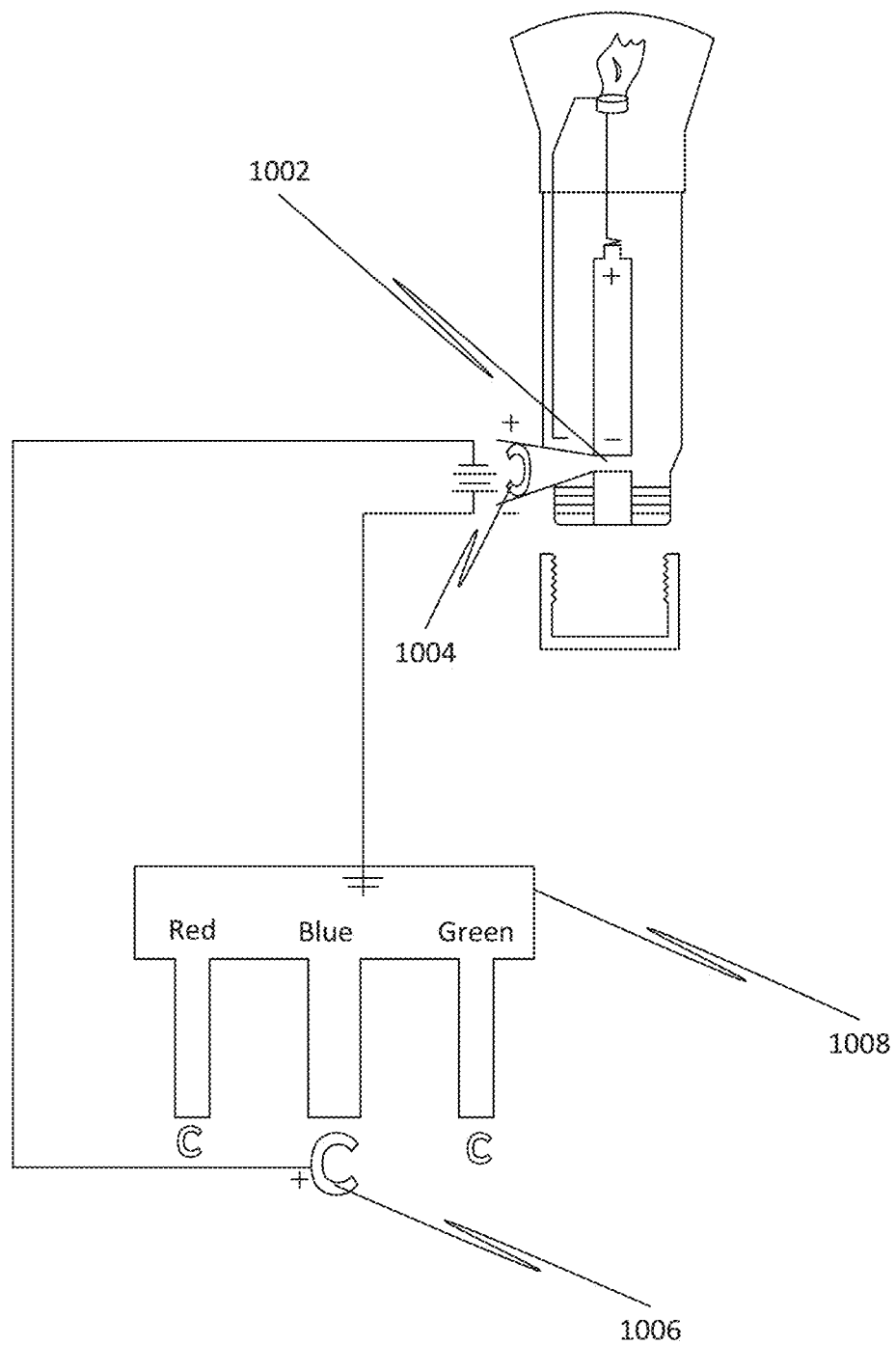
FIG. 10 is a disassembled view of the apparatus 300, in accordance with some embodiments.

FIG. 10 is a disassembled view of the apparatus 300, in accordance with some embodiments. Accordingly, the mediator device may include a contact circuit 1002, a plastic barrier 1004, a contact base plate 1006, and a plurality of paw pad keys 1008.

Further, the contact circuit 1002 may comprise a dielectric sandwich assembly switch control for the blue light of the at least one signaling device 306. Further, the plastic barrier 1004 may be configured to be installed between the contacts of the contact circuit.

Figure 11:
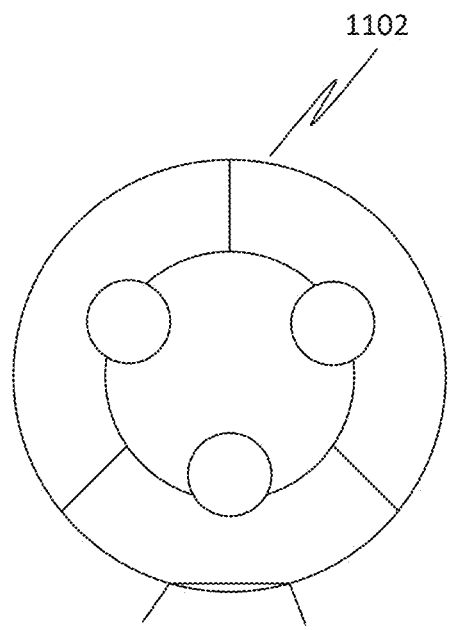
FIG. 11 is a perspective view of a cap end section 1102 of the apparatus 300, in accordance with some embodiments.

FIG. 11 is a rear view of a cap end section 1102 of the apparatus 300, in accordance with some embodiments.

Figure 12:
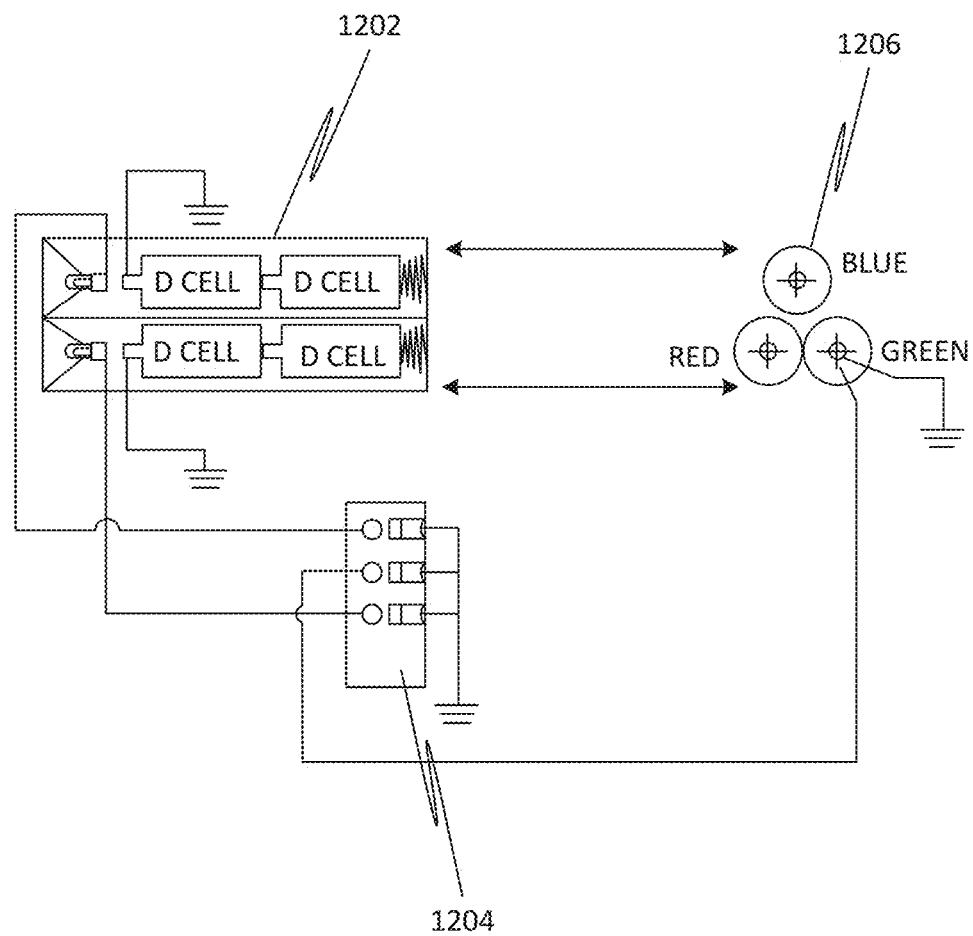
FIG. 12 is a circuit diagram of the apparatus 300, in accordance with some embodiments.

FIG. 12 is a circuit diagram of the apparatus 300, in accordance with some embodiments. Accordingly, the apparatus 300 may include a battery 1202, a plurality of switches 1204, and at least one signaling device (mediator device) 306.

Figure 13:
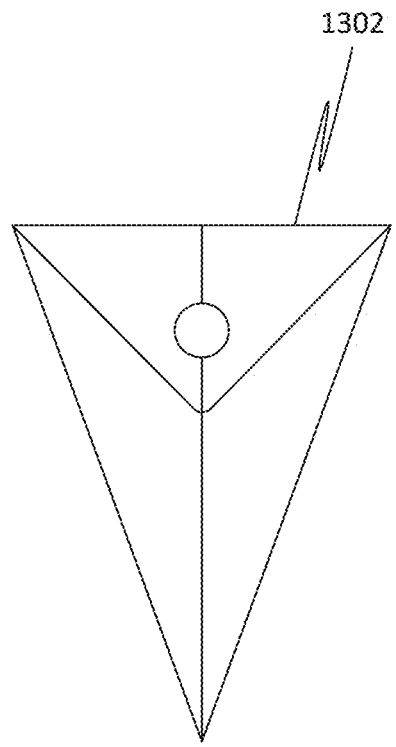
FIG. 13 is a perspective view of at least one signaling device (mediator device) 1302 of the apparatus 300, in accordance with some embodiments.

FIG. 13 is a perspective view of at least one signaling device (mediator device) 1302 of the apparatus 300, in accordance with some embodiments. Accordingly, the at least one signaling device 1302 may be configured for signaling a code language. Further, the at least one signaling device 1302 may be configured for generating red, green, and blue light. Further, a flash signal can be generated by generating all the red, green, and blue lights at once. Further, in the code language "Dog run very fast." may be represented as a code " . . . -//.\\.-\\---..-/-.--/.-\-..\\-.\//.-/-./\-.. \\\.\\/.---./\/ . . . ". Further, the code may be illustrated by generating Flash, Flash, Flash, Blue, Green, Green, Flash, red, green, red, Flash, blue, red, red, flash, blue, blue, blue, flash, flash, blue, green, blue, flash, blue, blue, green, flash, blue, red, blue, flash, flash, red, red, blue, flash, red, green, green, flash, blue, green, blue, flash, green, red, blue, flash, flash, red, red, red, flash, red, red green, flash, blue, blue, blue, flash, green, red, green, flash, flash, flash signals on the at least one signaling device 1302.

Figure 14:
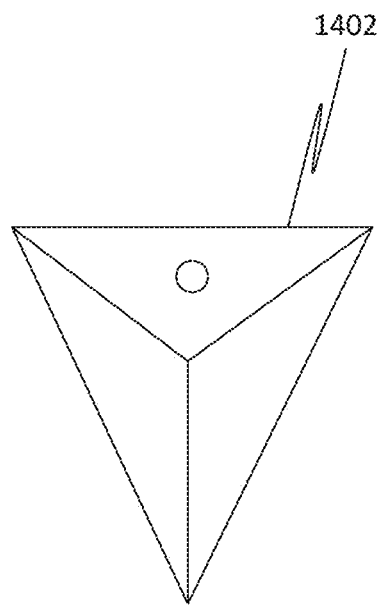
FIG. 14 is a front view of at least one signaling device (mediator device) 1402 of the apparatus 300, in accordance with some embodiments.

FIG. 14 is a front view of at least one signaling device (mediator device) 1402 of the apparatus 300, in accordance with some embodiments. Accordingly, the at least one signaling device 306 may be configured for generating 3 frequencies.

Further, the mediator device is in key-in configuration. Human perception in the brain needs by position-effect, so it is the line slant that defines visually not color. Color is for digital readers.

The poem of the rule of position effect related to color effect is red, right is someone returning the 3 "Rs".

Figure 15:
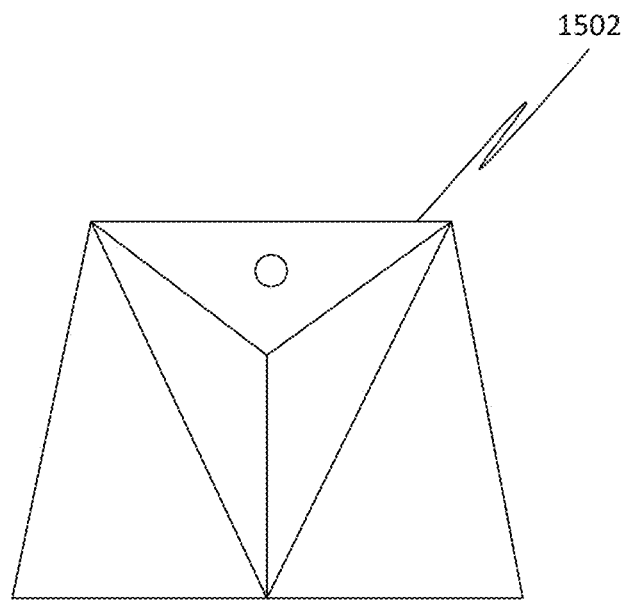
FIG. 15 is an illustration of a wearable article that may be embedded with at least one signaling device (mediator device) 1502, in accordance with some embodiments.

FIG. 15 is an illustration of a wearable article that may be embedded with at least one signaling device (mediator device) 1502, in accordance with some embodiments.

FIG. 16 is an illustration of at least one component of the apparatus 300 for facilitating light based communications, in accordance with some embodiments.

Figure 17:
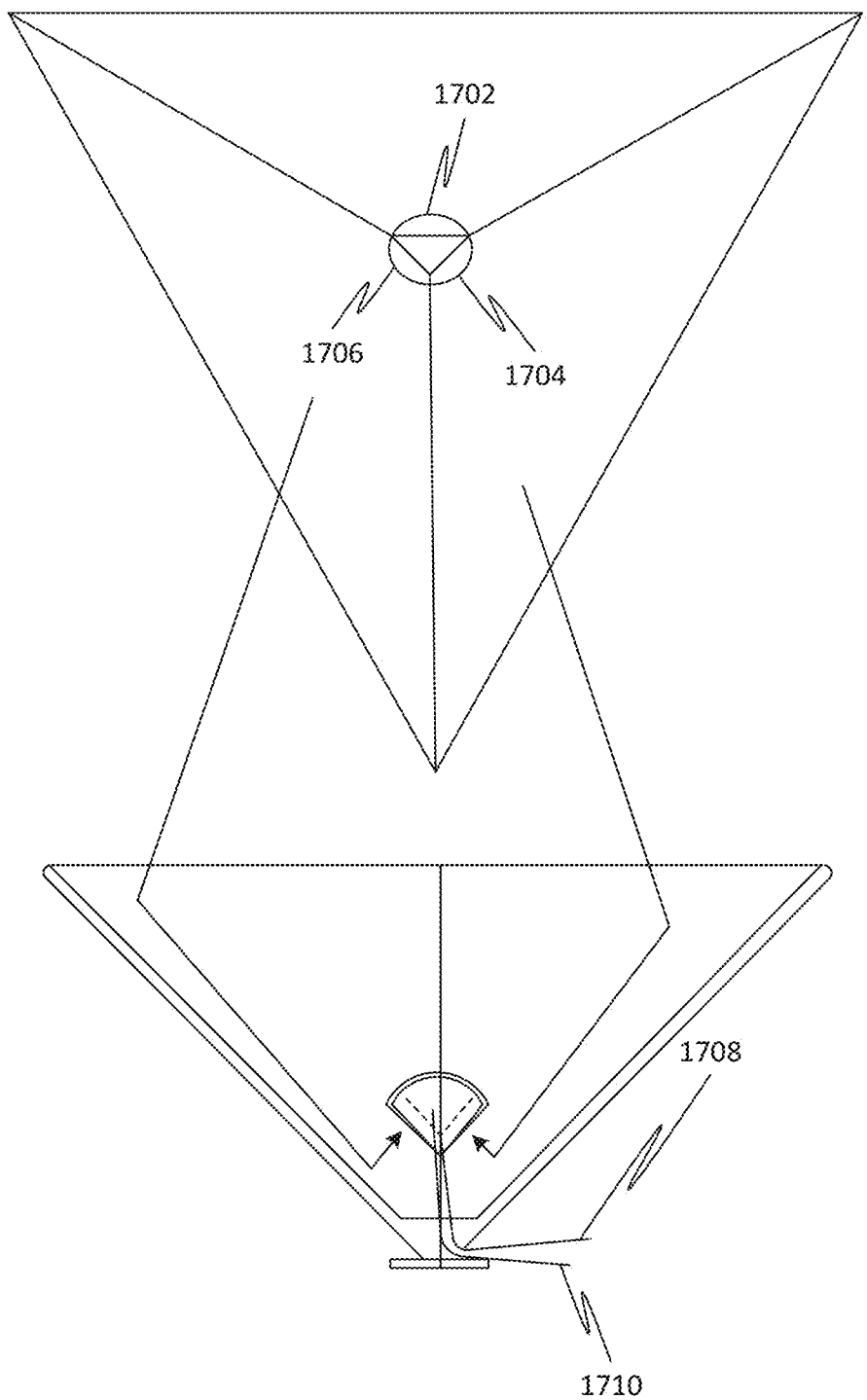
FIG. 17 is a schematic of the apparatus 300 for facilitating light signal receiver sensor input device to server from signal of mediator device.

FIG. 17 is a schematic of the apparatus 300 for facilitating light signal receiver sensor input device to server from signal of mediator device. Accordingly, the apparatus 300 may include a mirror Side receiver to blue light sensor 1702, a mirror side to green light receiver sensor 1704, a mirror side to red light receiver sensor 1706, and a plurality of sensor electrodes 1708-1710.

Figure 18:
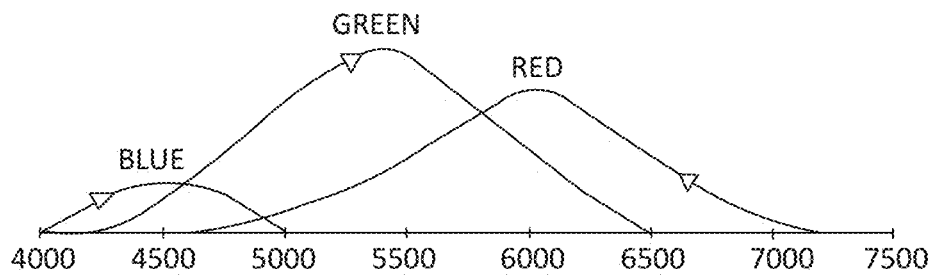
FIG. 18 is an illustration of three different light frequencies emitted by three different light emitters, in accordance with some embodiments.

FIG. 18 is an illustration of three different light frequencies emitted by three different light emitters, in accordance with some embodiments.

Figure 19:
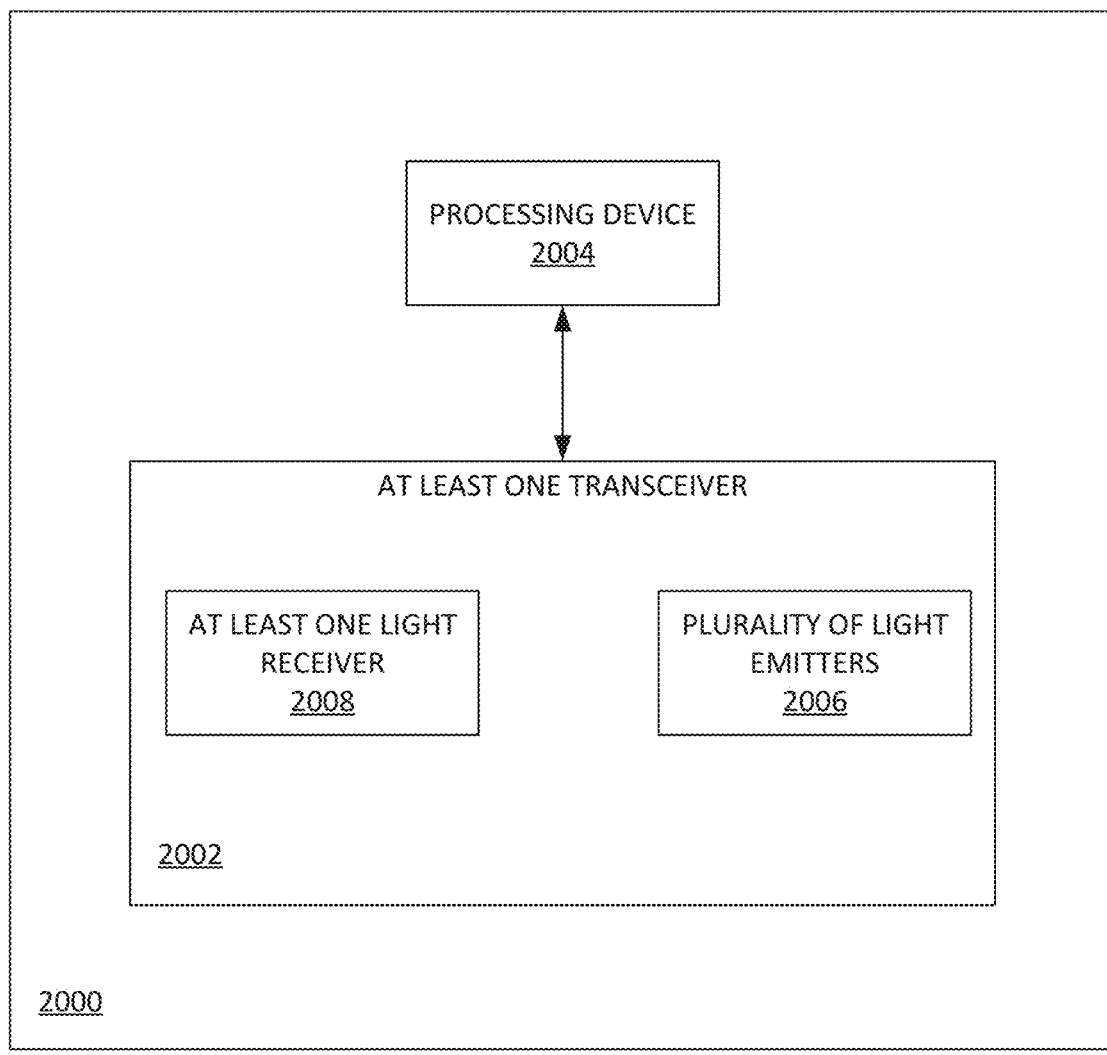
FIG. 19 is a block diagram of an apparatus 2000 for facilitating light based communications, in accordance with some embodiments.

FIG. 19 is a block diagram of an apparatus 2000 for facilitating light based communications, in accordance with some embodiments. Accordingly, the apparatus 2000 may include at least one transceiver 2002 and a processing device 2004.

Further, the at least one transceiver 2002 may include a plurality of light emitters 2006 and at least one light receiver 2008. Further, the plurality of light emitters 2006 emits a plurality of light. Further, the plurality of light may be associated with a plurality of light colors. Further, the at least one light receiver 2008 may be configured for detecting at least one incoming light signal associated with at least one communication. Further, the at least one incoming light signal may be comprised of one or more of the plurality of light colors with one or more sequences. Further, the plurality of light emitters 2006 may be configured for generating light. Further, the plurality of light emitters 2006 may include light emitting diodes, halogen bulbs, etc. Further, the plurality of lights may include a blue light, a red light, a green light, a combination of light, etc. Further, the at least one light receiver 2008 may include photodiodes, photo transistors, etc. Further, the at least one incoming light signal may include a light associated with light characteristics, for example, color, pattern of lighting, intensity, etc. Further, the at least one communication may include a transmission and/or a reception of an information.

Further, the processing device 2004 may be operatively coupled with the at least one transceiver 2002. Further, the processing device 2004 may be configured for generating at least one incoming coded message based on the detecting. Further, the generating of the at least one incoming coded message may include obtaining at least one symbol from the at least one incoming light signal based on the one or more light colors in the one or more sequences. Further, the at least one incoming coded message may include a pattern of symbols, for example, Morse code, binary code, etc. Further, the at least one symbol may include /,.,\,-, etc. Further, the at least one symbol may include letters of the "Azureakandt" code light signal alphabet. Further, each of the at least one symbol corresponds to a color of light of the plurality of light.

Further, the processing device 2004 may be configured for decoding the at least one incoming coded message into at least one incoming message using the at least one coding scheme. Further, the at least one coding scheme may include a map of symbols to characters in a natural language, a map of symbols to ASCII, a map of symbols to digital data, etc.

Further, the processing device 2004 may be configured for provisioning the at least one incoming message based on the decoding.

Further, the processing device 2004 may be configured for obtaining at least one outgoing message associated with the at least one communication. Further, the at least one outgoing message may include a text, an audio, a video, data, etc.

Further, the processing device 2004 may be configured for encoding the at least one outgoing message using the at least one coding scheme based on the obtaining of the at least one outgoing message.

Further, the processing device 2004 may be configured for generating at least one encoded outgoing message based on the encoding. Further, the at least one encoded outgoing message may be comprised of a plurality of symbols. Further, the at least one encoded outgoing message may include a first pattern of symbols, for example, Morse code. Further, the plurality of symbols may include /,.,\,-, etc.

Further, the processing device 2004 may be configured for generating at least one command for the at least one transceiver 2002 based on the generating of the at least one encoded outgoing message. Further, the at least one command may include at least one sequence for activating at least one of the plurality of light emitters 2006. Further, at least one of the plurality of light emitters emits at least one of the plurality of light based on the activating. Further, at least one of the plurality of light emitters 2006 may be configured for emitting at least one outgoing light signal based on the at least one command. Further, the emitting of the at least one outgoing light signal may include generating a pattern of lighting of the plurality of lights. Further, the at least one outgoing light signal may include at least one of the plurality of light in the at least one sequence. Further, the at least one incoming message and the at least one outgoing message may be data packets.

Figure 20:
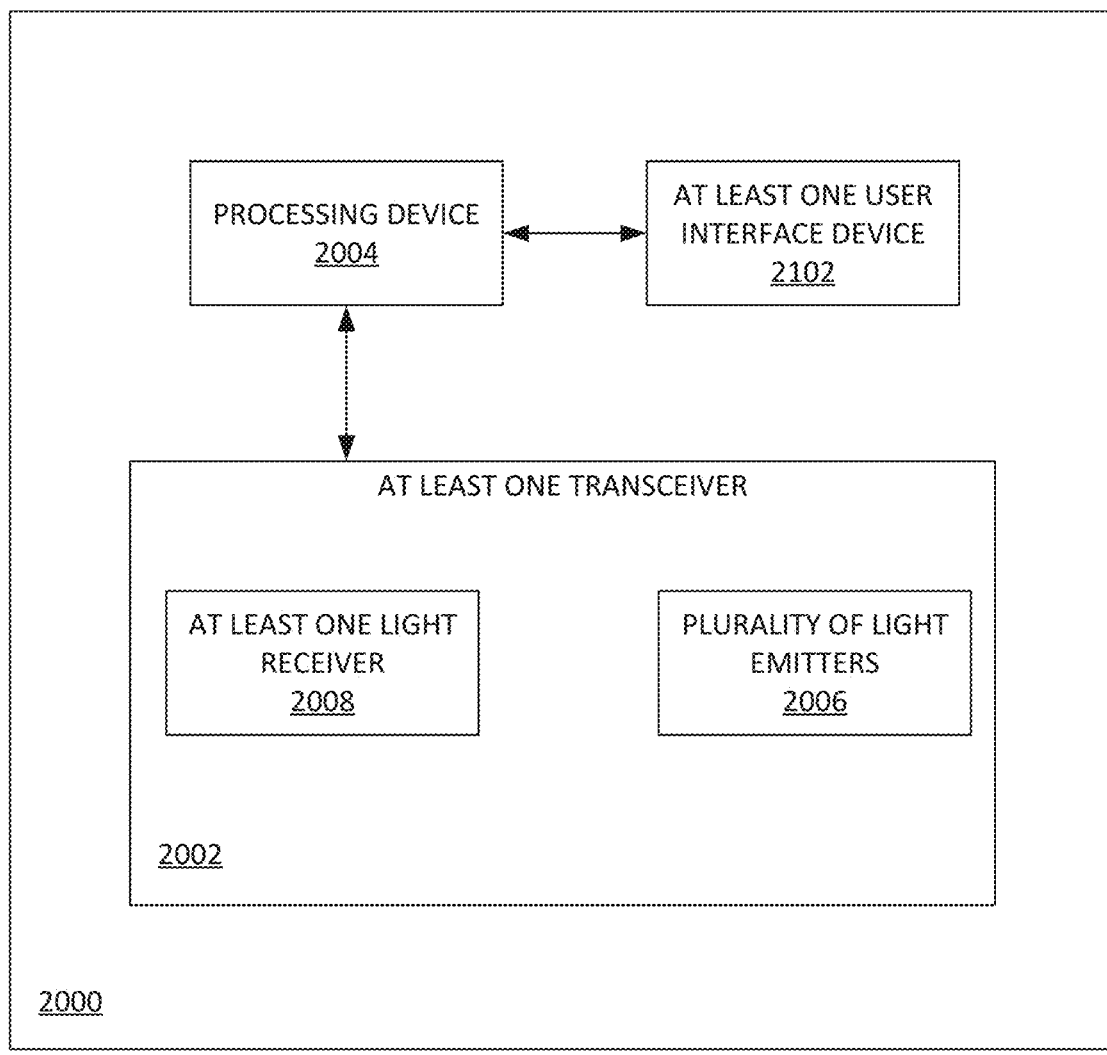
FIG. 20 is a block diagram of the apparatus 2000 for facilitating light based communications, in accordance with some embodiments.

Further, in some embodiments, the apparatus 2000 may include at least one user interface device 2102, as shown in FIG. 20, communicatively coupled with the processing device 2004. Further, the at least one user interface device 2102 may include a smartphone, a tablet, a personal computer, a desktop, a display screen, a display headset, etc. Further, the at least one user interface device 2102 may be configured for generating the at least one outgoing message associated with the at least one communication. Further, the obtaining of the at least one outgoing message may be based on the generating. Further, the at least one user interface device 2102 may be further configured for presenting the at least one incoming message. Further, the provisioning of the at least one incoming message may be further based on the presenting.

Further, in some embodiments, the obtaining of the at least one outgoing message may be based on a message generating event process as a controlled event sequence in time. Further, the provisioning of the at least one incoming message may be further based on a message presenting event process of the controlled event sequence in time.

Figure 21:
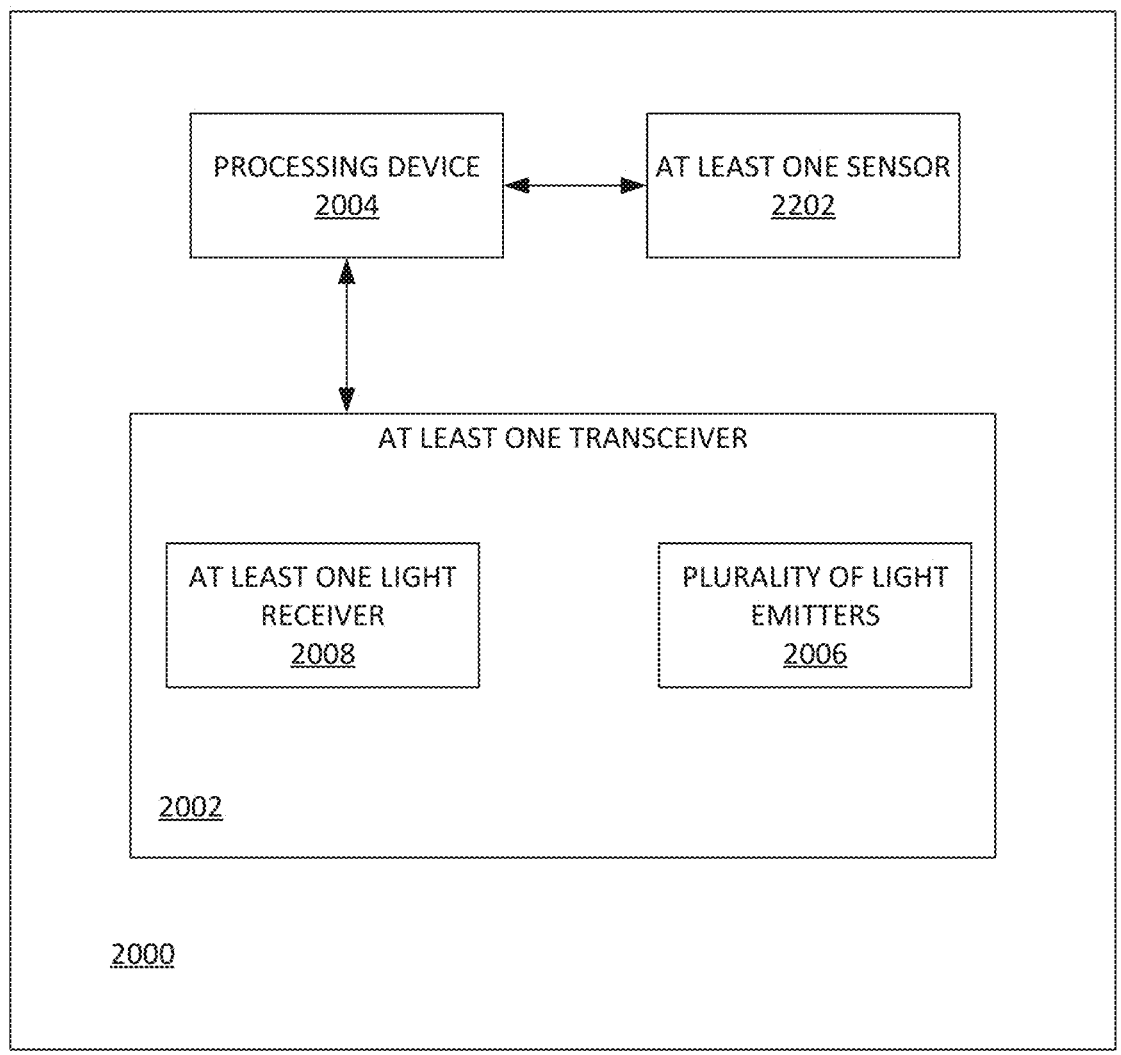
FIG. 21 is a block diagram of the apparatus 2000 for facilitating light based communications, in accordance with some embodiments.

Further, in some embodiments, the apparatus 2000 may include at least one sensor 2202, as shown in FIG. 21, communicatively coupled with the processing device 2004. Further, the at least one sensor 2202 may include a position sensor, an ultrasonic sensor, an infrared sensor, etc. Further, the at least one sensor 2202 may be configured for detecting at least one of a gesture, an expression, and a movement associated with at least one user. Further, at least one of the gesture, the expression, and the movement may include hands movement and positioning, eyebrows movement and positioning, touching a forehead with a hand, tongue movement and positioning, etc. Further, the at least one user may include a human. Further, the processing device 2004 may be communicatively coupled with the at least one sensor 2202. Further, the processing device 2004 may be configured for generating at least one sensor data based on the detecting of at least one of the gesture, the expression, and the movement of the at least one user. Further, the at least one sensor data may include data associated with at least one of the gesture, the expression, and the movement of the at least one user.

Further, the processing device 2004 may be configured for analyzing the at least one sensor data. Further, the obtaining of the at least one outgoing message may be further based on the analyzing of the at least one sensor data.

Further, in an embodiment, the apparatus 2000 may include an apparatus body configured to be secured to at least a part of a body of the at least one user. Further, the at least one part of the body may include a face, a wrist, a head, an arm, etc. Further, the apparatus body may include the at least one transceiver 2002, the processing device 2004, and the at least one sensor 2202.

Further, in an embodiment, the apparatus body may include a head band portion and a chin strap portion attached to the head band portion. Further, the head band portion may include a strap. Further, the chin strap portion may include a rubber strap configured to encompass the at least one sensor 2202. Further, the head band portion may be configured to be secured to a head of the at least one user and the chin strap portion may be configured to be secured around a face of the user. Further, the plurality of light emitters 2006 of the at least one transceiver 2002 may be disposed on the head band portion of the apparatus body. Further, the plurality of light emitters 2006 faces outwardly away from the head of the at least one user. Further, the at least one sensor 2202 may be comprised in the chin strap portion of the apparatus body.

Figure 22:
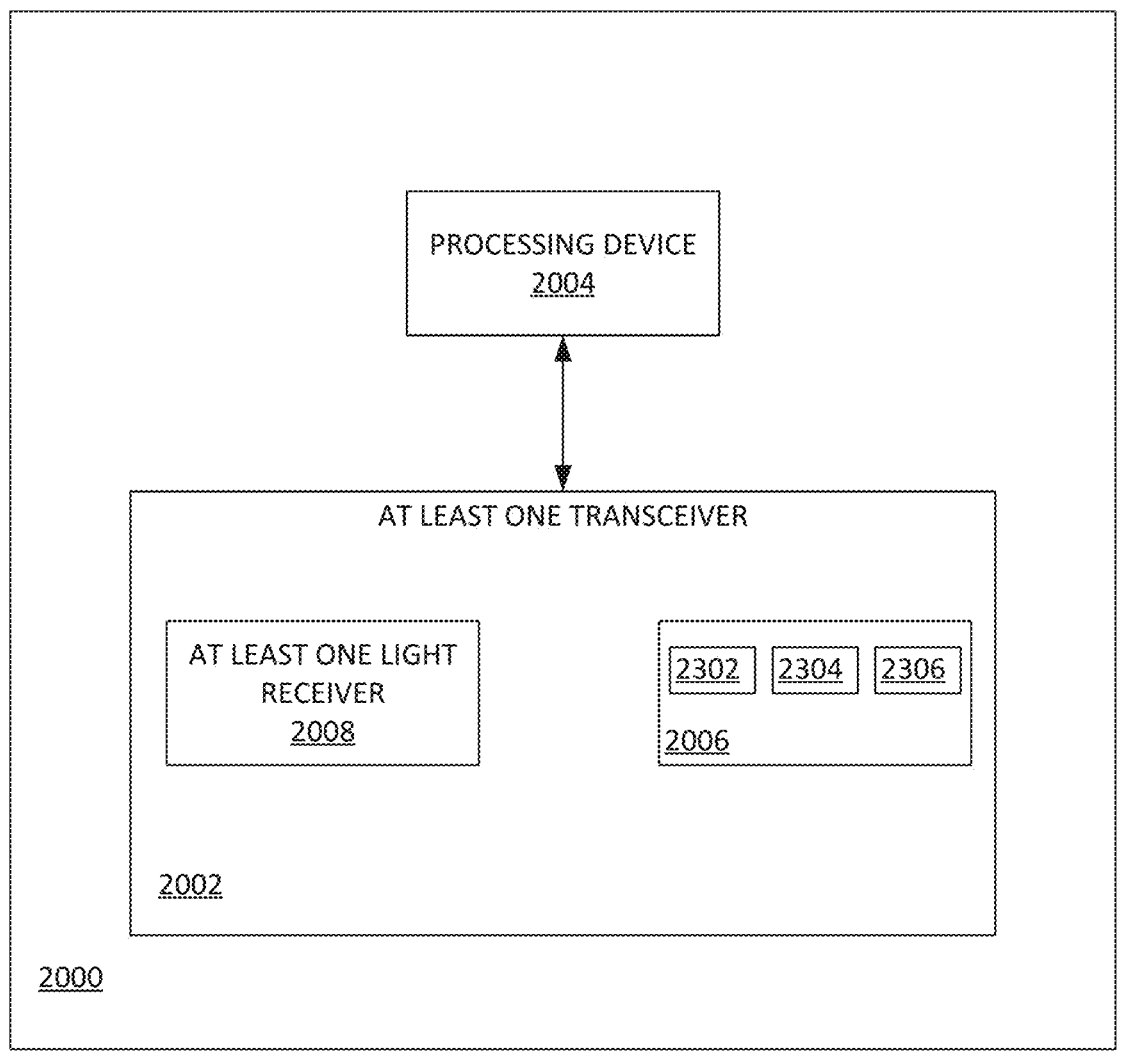
FIG. 22 is a block diagram of the apparatus 2000 for facilitating light based communications, in accordance with some embodiments.

Further, in some embodiments, the plurality of light may include a first light characterized by a first spectral range, a second light characterized by a second spectral range, and a third light characterized by a third spectral range. Further, the first spectral range, the second spectral range, and the third spectral range may be distinct. Further, the first light may include a red light. Further, the second light may include a blue light. Further, the third light may include a green light. Further, the plurality of light emitters 2006 may include a first light emitter 2302, a second light emitter 2304, and a third light emitter 2306, as shown in FIG. 22. Further, the first light emitter 2302 emits the first light, the second light emitter emits 2304 the second light, and the third light emitter 2306 emits the third light.

Further, in an embodiment, the first spectral range, the second spectral range, and the third spectral range belong to a visible portion of the electromagnetic spectrum. Further, the first spectral range may include a range of wavelength of red light associated with visible electromagnetic spectrum. Further, the second spectral range may include a range of wavelength of blue light associated with visible electromagnetic spectrum. Further, the third spectral range may include a range of wavelength of green light associated with visible electromagnetic spectrum.

Further, in an embodiment, the first spectral range, the second spectral range, and the third spectral range belong to an infrared portion of the electromagnetic spectrum.

Figure 23:
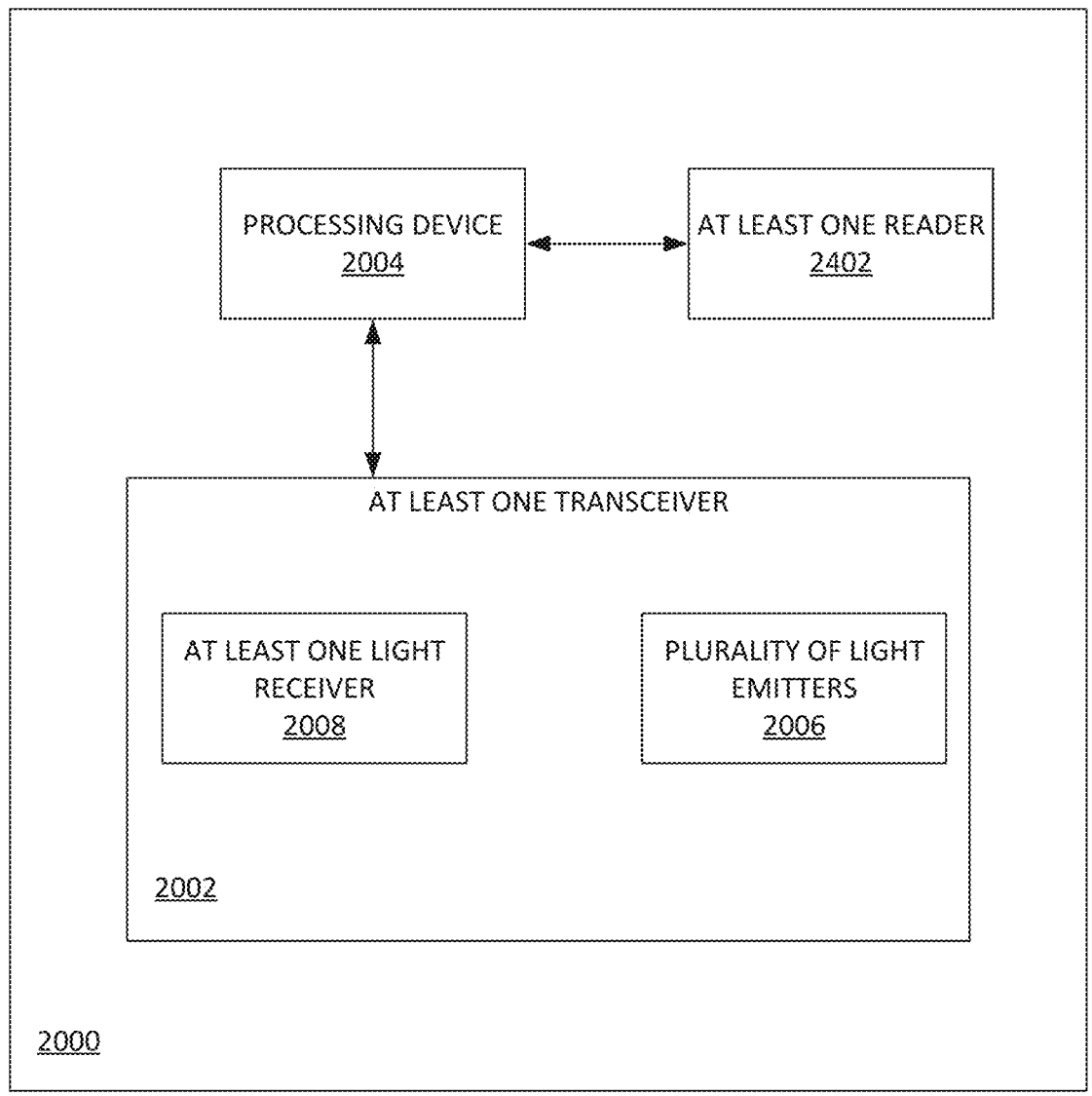
FIG. 23 is a block diagram of the apparatus 2000 for facilitating light based communications, in accordance with some embodiments.

Further, in some embodiments, the apparatus 2000 may include at least one reader 2402, as shown in FIG. 23, communicatively coupled with the processing device 2004. Further, the at least one reader 2402 may include an electron microscope unit. Further, the reading may include obtaining a signal refraction architecture using the electron microscope unit. Further, the at least one reader 2402 may be configured for reading one or more structures of one or more neuron pathways in a gold-embossed micro-tissue slide associated with the apparatus 2000. Further, the one or more structures of one or more neuron pathways in a gold-embossed micro-tissue slide may include at least one sample of a brain tissue. Further, the processing device 2004 may be further configured for generating a unique authentication signature for the apparatus 2000 based on the reading. Further, the at least one authentication signature may include a gold embossed slide print of a micro-graphed structure of a freeze-dried microscopically sliced murine brain.

Further, the processing device 2004 may be further configured for appending the at least one outgoing message with the unique authentication signature based on the generating of the unique authentication signature. Further, the encoding of the at least one outgoing message may be further based on the appending.

Figure 24:
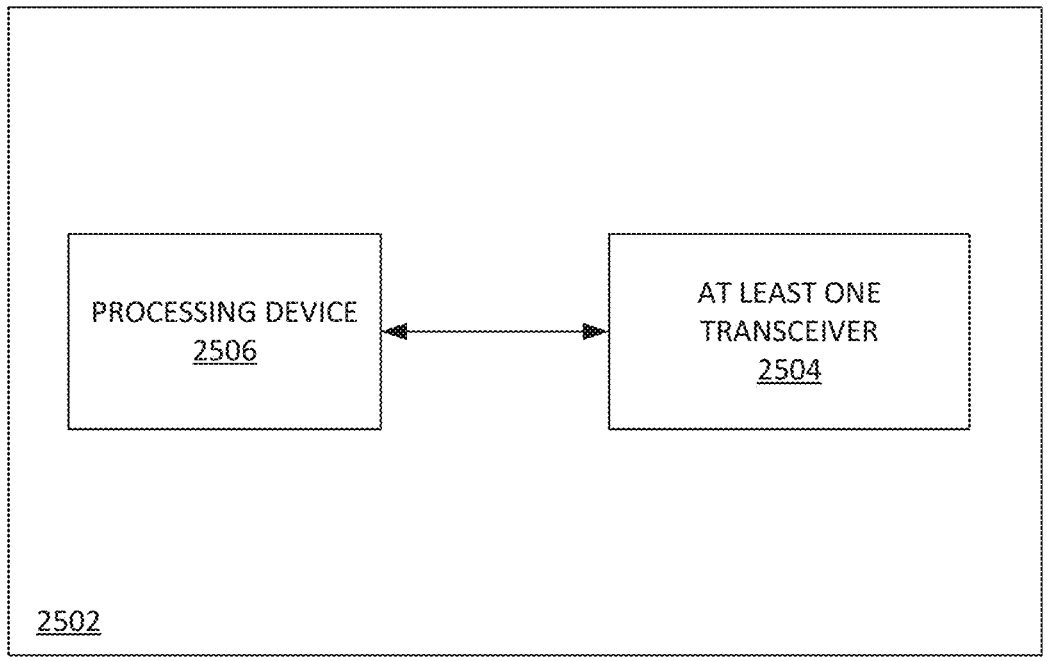
FIG. 24 is a block diagram of the apparatus 2000 for facilitating light based communications, in accordance with some embodiments.

Further, in some embodiments, the at least one communication may be between the apparatus 2000 and at least one communication apparatus 2502, as shown in FIG. 24. Further, the at least one communication apparatus 2502 may include at least one transceiver 2504 and a processing device 2506 operatively coupled with the at least one transceiver 2504. Further, the at least one transceiver 2504 may be configured for receiving, and transmitting a light signal. Further, the at least one communication apparatus 2502 may include a modular deducer.

Figure 25:
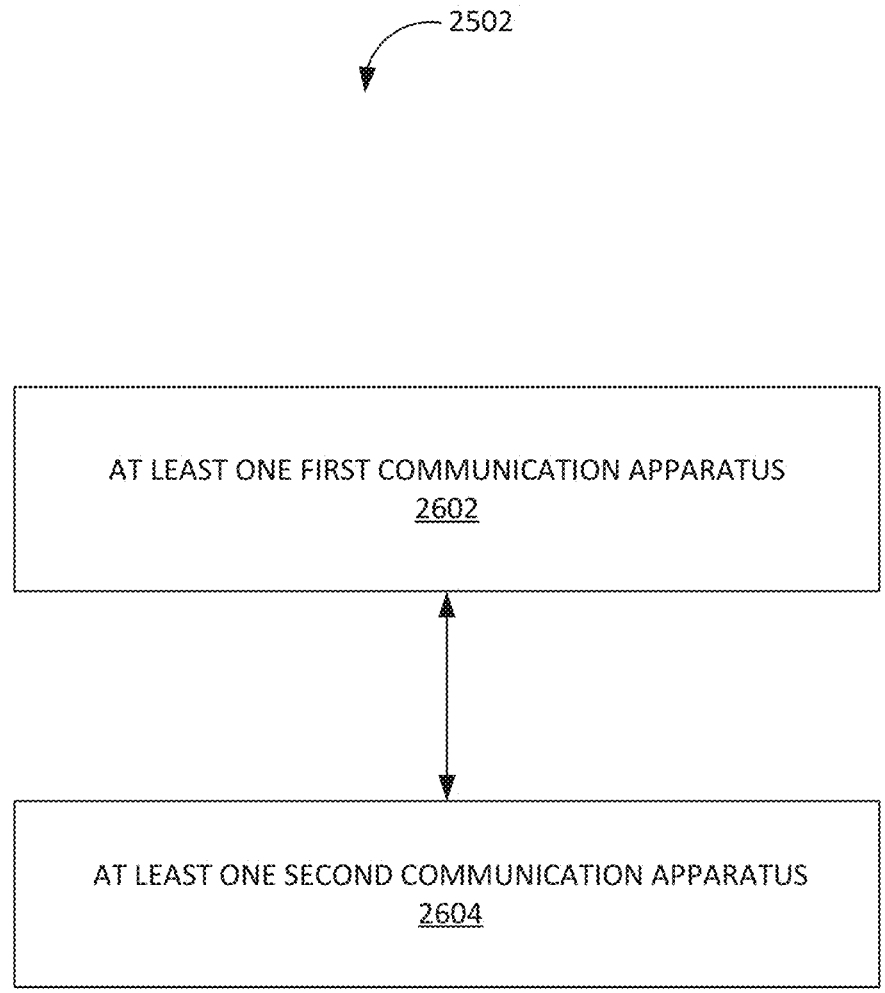
FIG. 25 is a block diagram of the apparatus 2000 for facilitating light based communications, in accordance with some embodiments.

Further, in an embodiment, the at least one communication apparatus 2502 may include at least one first communication apparatus 2602 and at least one second communication apparatus 2604, as shown in FIG. 25. Further, the at least one first communication apparatus 2602 may include a pitcher modular deducer. Further, the at least one second communication apparatus 2604 may include a catcher modular deducer. Further, the at least one first communication apparatus 2602 communicates with the at least one second communication apparatus 2604 using at least one light signal for facilitating the at least one communication. Further, the at least one light signal may include a pattern of lighting of the plurality of light emitters 2006 Further, each of the at least one first communication apparatus 2602 and the at least one second communication apparatus 2604 may include a time reference verification filter. Further, the time reference verification filter may include a data associated with day-axis spin and wobble. Further, the time reference verification filter may be configured for verifying one or more communications between the at least one first communication apparatus 2602 and the at least one second communication apparatus 2604 based on a predictable pattern of the at least one light signal.

Further, in an embodiment, the at least one communication apparatus 2502 may include at least one Buckminsterfullerene glass crystal ball (such as a buckminsterfullerene ball glass crystal light refractor 212) and at least one movement mechanism (the at least one movement mechanism includes a spinning and oscillating mechanism 208, a mirror 210, a battery 202, a switch 204, an electric motor 206, etc.) coupled with the at least one Buckminsterfullerene glass crystal ball. Further, the at least one Buckminsterfullerene glass crystal ball may be comprised of at least one transparent material and shaped as Buckminsterfullerene. Further, the at least one movement mechanism may be configured for rotating the at least one Buckminsterfullerene glass crystal ball. Further, the at least one movement mechanism may include a rotatory bearing, a rotatory shaft, etc. Further, the at least one Buckminsterfullerene glass crystal ball may be associated with at least three rotational parameters based on the rotating. Further, the at least three rotational parameters may include variable time in orbit, day-axis spin, wobble of the at least one Buckminsterfullerene glass crystal ball. Further, the at least one Buckminsterfullerene glass crystal ball may be configured for encrypting the at least one communication based on the at least three rotational parameters by transforming the at least one outgoing light signal to at least one outgoing communication light signal. Further, the at least one Buckminsterfullerene glass crystal ball may be configured for decrypting the at least one communication based on the at least three rotational parameters by transforming at least one incoming communication light signal to the at least one incoming light signal.

FIG. 20 is a block diagram of the apparatus 2000 for facilitating light based communications, in accordance with some embodiments.

FIG. 21 is a block diagram of the apparatus 2000 for facilitating light based communications, in accordance with some embodiments.

FIG. 22 is a block diagram of the apparatus 2000 for facilitating light based communications, in accordance with some embodiments.

FIG. 23 is a block diagram of the apparatus 2000 for facilitating light based communications, in accordance with some embodiments.

FIG. 24 is a block diagram of the apparatus 2000 for facilitating light based communications, in accordance with some embodiments.

FIG. 25 is a block diagram of the apparatus 2000 for facilitating light based communications, in accordance with some embodiments.

Figure 26:
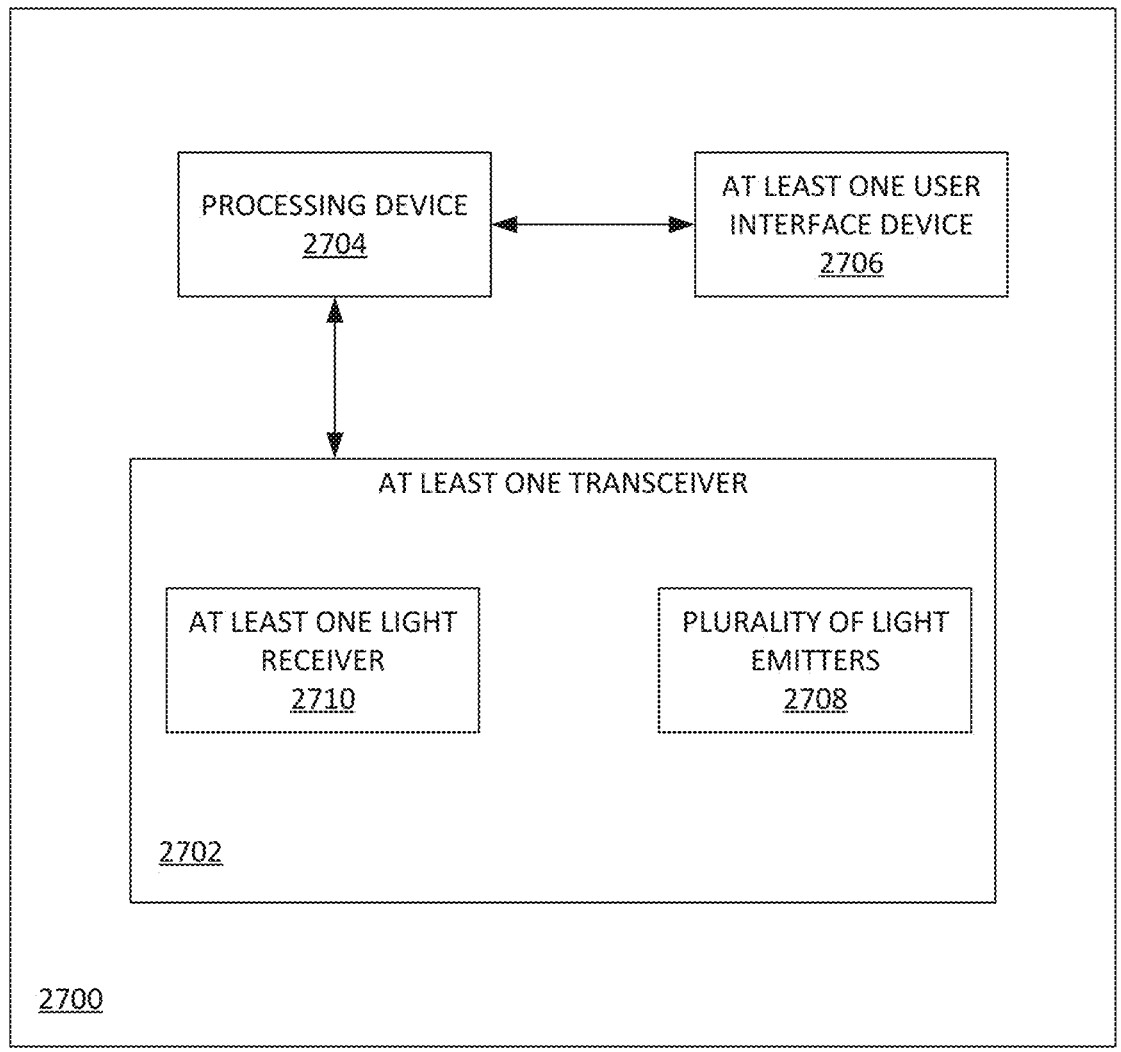
FIG. 26 is a block diagram of an apparatus 2700 for facilitating light based communications, in accordance with some embodiments.

FIG. 26 is a block diagram of an apparatus 2700 for facilitating light based communications, in accordance with some embodiments. Accordingly, the apparatus 2700, may include at least one transceiver 2702, a processing device 2704, and at least one user interface device 2706.

Further, the at least one transceiver 2702 may include a plurality of light emitters 2708 and at least one light receiver 2710. Further, the plurality of light emitters 2708 emits a plurality of light. Further, the at least one light receiver 2710 may be configured for detecting at least one incoming light signal associated with at least one communication. Further, the plurality of light emitters 2708 may be configured for generating light. Further, the plurality of light emitters 2708 may include a light emitting diode, a halogen bulb, etc. Further, the plurality of lights may include a blue light, a red light, a green light, etc. Further, the at least one light receiver 2710 may include a device configured for converting light to electrical signals, for example, photodiodes, photo transistors, etc. Further, the at least one incoming light signal may include a light associated with light characteristics, for example, color, pattern of lighting, intensity, etc. Further, the at least one communication may include transmission of an information.

Further, the processing device 2704 may be operatively coupled with the at least one transceiver 2702. Further, the processing device 2704 may be configured for generating at least one incoming coded message based on the detecting. Further, the at least one incoming coded message may include a pattern of symbols, for example, Morse code, binary code, etc.

Further, the processing device 2704 may be configured for decoding the at least one incoming coded message into at least one incoming message using at least one coding scheme. Further, the at least one coding scheme may include a set of codes, mapping, for example, convolutional decoding, strings, etc.

Further, the processing device 2704 may be configured for provisioning the at least one incoming message based on the decoding.

Further, the processing device 2704 may be configured for obtaining at least one outgoing message associated with the at least one communication. Further, the at least one outgoing message may include a text, an electrical signal, etc.

Further, the processing device 2704 may be configured for encoding the at least one outgoing message using the at least one coding scheme based on the obtaining of the at least one outgoing message. Further, the encoding may include conversion of the at least one outgoing message to an electrical signal.

Further, the processing device 2704 may be configured for generating at least one encoded outgoing message based on the encoding. Further, the at least one encoded outgoing message may be comprised of a plurality of symbols. Further, the at least one encoded outgoing message may include a second pattern of symbols, for example, Morse code. Further, the plurality of symbols may include a dot, a dash, etc.

Further, the processing device 2704 may be configured for generating at least one command for the at least one transceiver 2702 based on the generating of the at least one encoded outgoing message. Further, the at least one command may include an electric signal configured for controlling supply of electric current to the plurality of light emitters 2708. Further, the at least one command may include at least one sequence for activating at least one of the plurality of light emitters 2708. Further, at least one of the plurality of light emitters 2708 may be configured for emitting at least one outgoing light signal based on the at least one command. Further, the emitting of the at least one outgoing light signal may include generating a pattern of lighting of the plurality of lights.

Further, the at least one user interface device 2706 may be communicatively coupled with the processing device 2704. Further, the at least one user interface device 2706 may be configured for generating the at least one outgoing message associated with the at least one communication. Further, the obtaining of the at least one outgoing message may be based on the generating. Further, the at least one user interface device 2706 may be further configured for presenting the at least one incoming message. Further, the provisioning of the at least one incoming message may be further based on the presenting.

Figure 27:
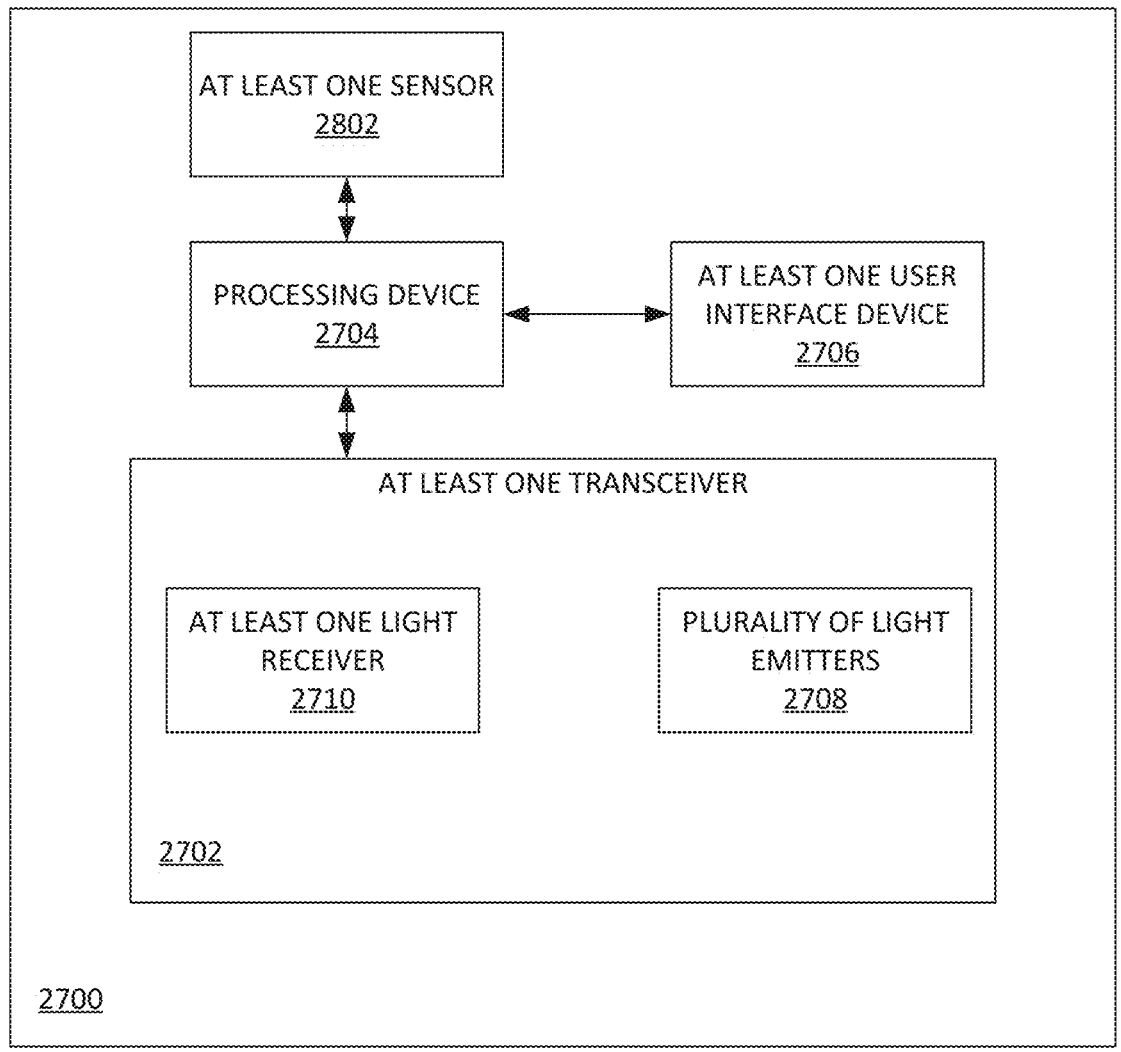
FIG. 27 is a block diagram of the apparatus 2700 for facilitating light based communications, in accordance with some embodiments.

Further, in some embodiments, the apparatus 2700 may include at least one sensor 2802, as shown in FIG. 27 communicatively coupled with the processing device 2704. Further, the at least one sensor 2802 may include a position sensor, an ultrasonic sensor, an infrared sensor, a camera, a movement sensor, etc. Further, the at least one sensor 2802 may be configured for detecting at least one of a gesture, an expression, and a movement associated with at least one user. Further, the at least one of a gesture, an expression, and a movement may include moving hands, moving eyebrows, touching forehead with hand, etc. Further, the at least one user may include a human. Further, the processing device 2704 may be configured for generating at least one sensor data based on the detecting of at least one of the gesture, the expression, and the movement of the at least one user. Further, the at least one sensor data may include a type of gesture, a tongue movement, etc.

Further, the processing device 2704 may be configured for analyzing the at least one sensor data. Further, the obtaining of the at least one outgoing message may be further based on the analyzing of the at least one sensor data.

Further, in an embodiment, the apparatus 2700 may include an apparatus body configured to be secured to at least a part of a body of the at least one user. Further, the at least one part of the body may include a face, a wrist, etc. Further, the apparatus body may include the at least one transceiver 2702, the processing device 2704, and the at least one sensor 2802.

Further, in an embodiment, the apparatus body may include a head band portion and a chin strap portion attached to the head band portion. Further, the head band portion may include a strap with at least one cavity of encompass the at least one transceiver 2702. Further, the head band portion may be configured to be secured to a head of the at least one user and the chin strap portion may be configured to be secured around a face of the user. Further, the chin strap portion may include a rubber strap configured to encompass the at least one sensor 2802. Further, the plurality of light emitters 2708 of the at least one transceiver 2702 may be disposed on the head band portion of the apparatus body. Further, the plurality of light emitters 2708 faces outwardly away from the head of the at least one user. Further, the at least one sensor 2802 may be comprised in the chin strap portion of the apparatus body.

Figure 28:
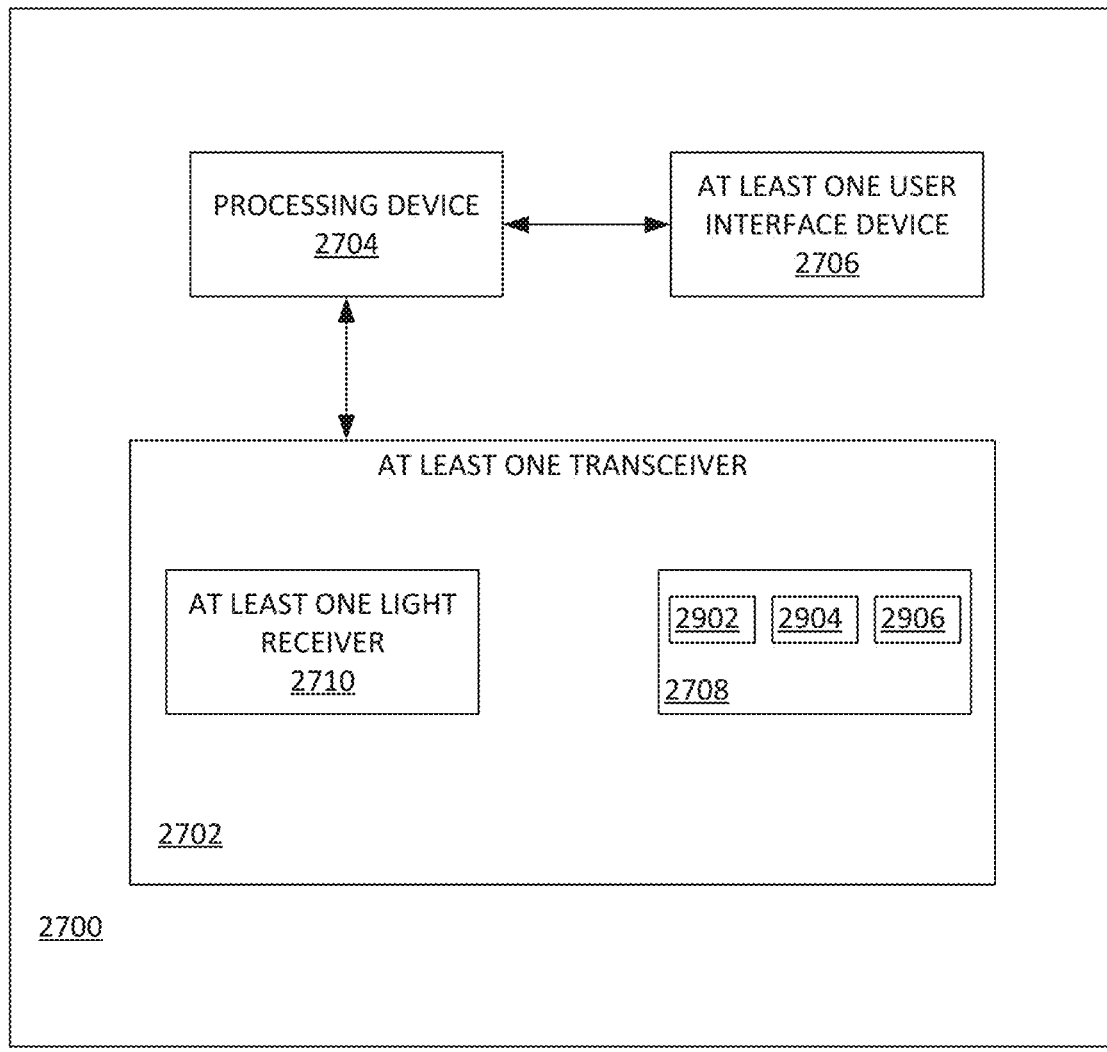
FIG. 28 is a block diagram of the apparatus 2700 for facilitating light based communications, in accordance with some embodiments.

Further, in some embodiments, the plurality of light may include a first light characterized by a first spectral range, a second light characterized by a second spectral range, and a third light characterized by a third spectral range. Further, the first light may include a red light. Further, the second light may include a blue light. Further, the third light may include a green light. Further, the first spectral range, the second spectral range, and the third spectral range may be distinct. Further, the plurality of light emitters 2708 may include a first light emitter 2902, a second light emitter 2904, and a third light emitter 2906, as shown in FIG. 28. Further, the first light emitter 2902 emits the first light, the second light emitter 2904 emits the second light, and the third light emitter 2906 emits the third light.

Further, in an embodiment, the first spectral range, the second spectral range, and the third spectral range belong to a visible portion of the electromagnetic spectrum. Further, the first spectral range may include a range of wavelength of red light associated with visible electromagnetic spectrum. Further, the second spectral range may include a range of wavelength of blue light associated with visible electromagnetic spectrum. Further, the third spectral range may include a range of wavelength of green light associated with visible electromagnetic spectrum.

Further, in an embodiment, the first spectral range, the second spectral range, and the third spectral range belong to an infrared portion of the electromagnetic spectrum.

FIG. 27 is a block diagram of the apparatus 2700 for facilitating light based communications, in accordance with some embodiments.

FIG. 28 is a block diagram of the apparatus 2700 for facilitating light based communications, in accordance with some embodiments.

Figure 29:
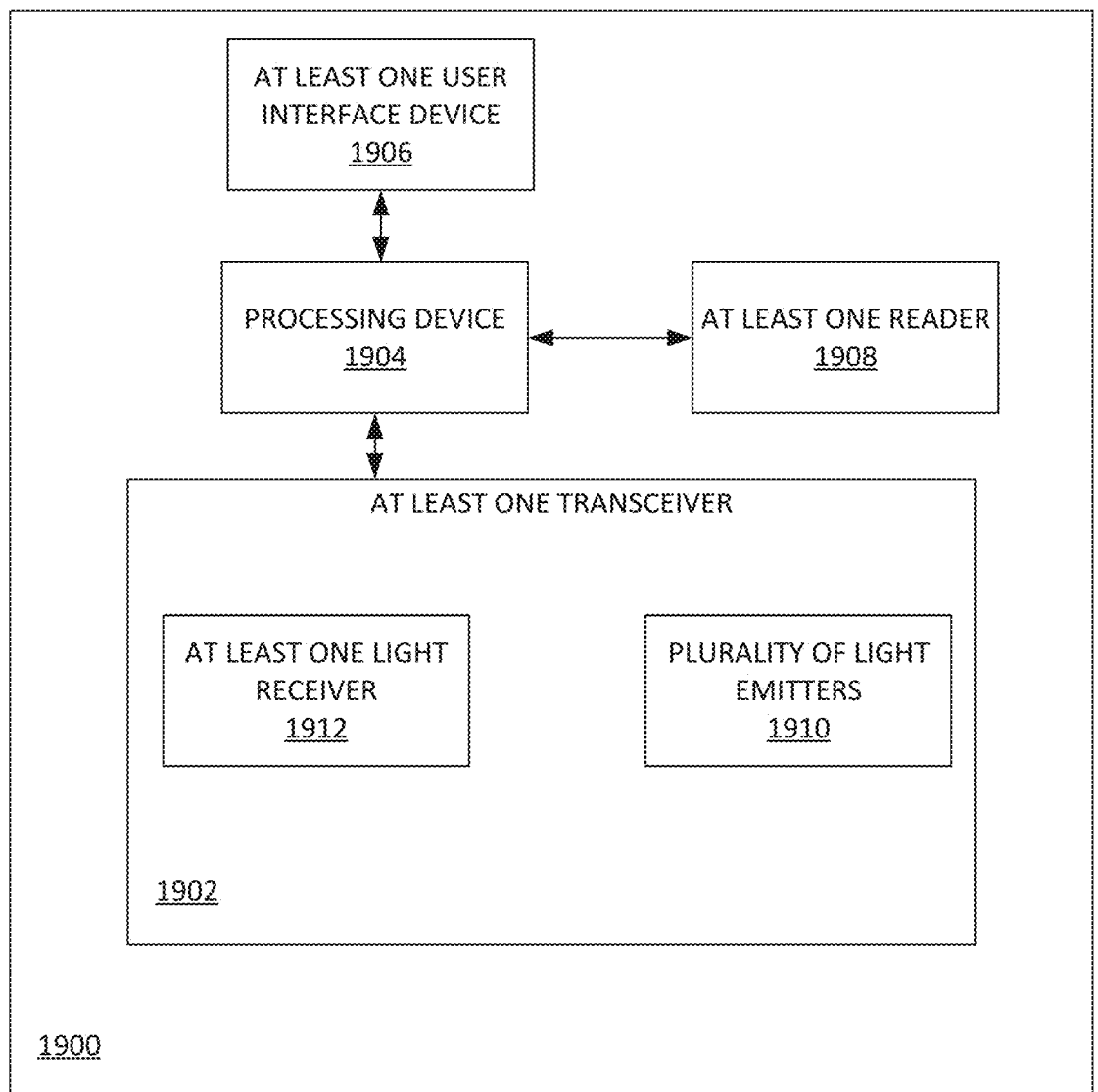
FIG. 29 is a block diagram of an apparatus 1900 for facilitating light based communications, in accordance with some embodiments.

FIG. 29 is a block diagram of an apparatus 1900 for facilitating light based communications, in accordance with some embodiments. Accordingly, the apparatus 1900, may include at least one transceiver 1902, a processing device 1904, at least one user interface device 1906, and at least one reader 1908.

Further, the at least one transceiver 1902 may include a plurality of light emitters 1910 and at least one light receiver 1912. Further, the plurality of light emitters 1910 emits a plurality of light. Further, the at least one light receiver 1912 may be configured for detecting at least one incoming light signal associated with at least one communication. Further, the plurality of light emitters 1910 may be configured for generating light. Further, the plurality of light emitters 1910 may include a light emitting diode, a halogen bulb, etc. Further, the plurality of lights may include a blue light, a red light, a green light, etc. Further, the at least one light receiver 1912 may include a device configured for converting light to electrical signals, for example, photodiodes, photo transistors, etc. Further, the at least one incoming light signal may include a light associated with light characteristics, for example, color, pattern of lighting, intensity, etc. Further, the at least one communication may include transmission of an information.

Further, the processing device 1904 may be operatively coupled with the at least one transceiver 1902. Further, the processing device 1904 may be configured for generating at least one incoming coded message based on the detecting. Further, the at least one incoming coded message may include a pattern of symbols, for example, Morse code, binary code, etc. Further, the at least one coding scheme may include a set of codes, mapping, for example, convolutional decoding, strings, etc.

Further, the processing device 1904 may be configured for decoding the at least one incoming coded message into at least one incoming message using at least one coding scheme.

Further, the processing device 1904 may be configured for provisioning the at least one incoming message based on the decoding.

Further, the processing device 1904 may be configured for obtaining at least one outgoing message associated with the at least one communication. Further, the at least one outgoing message may include a text, an electrical signal, etc.

Further, the processing device 1904 may be configured for encoding the at least one outgoing message using the at least one coding scheme based on the obtaining of the at least one outgoing message. Further, the encoding may include conversion of the at least one outgoing message to an electrical signal.

Further, the processing device 1904 may be configured for generating at least one encoded outgoing message based on the encoding. Further, the at least one encoded outgoing message may be comprised of a plurality of symbols. Further, the at least one encoded outgoing message may include a third pattern of symbols, for example, Morse code. Further, the plurality of symbols may include a dot, a dash, etc.

Further, the processing device 1904 may be configured for generating at least one command for the at least one transceiver 1902 based on the generating of the at least one encoded outgoing message. Further, the at least one command may include an electric signal configured for controlling supply of electric current to the plurality of light emitters 1910. Further, the at least one command may include at least one sequence for activating at least one of the plurality of light emitters 1910. Further, at least one of the plurality of light emitters 1910 may be configured for emitting at least one outgoing light signal based on the at least one command. Further, the emitting of the at least one outgoing light signal may include generating a pattern of lighting of the plurality of lights.

Further, the at least one user interface device 1906 may be communicatively coupled with the processing device 1904. Further, the at least one user interface device 1906 may include a smartphone, a tablet, a pc, a desktop, etc. Further, the at least one user interface device 1906 may be configured for generating the at least one outgoing message associated with the at least one communication. Further, the obtaining of the at least one outgoing message may be based on the generating. Further, the at least one user interface device 1906 may be further configured for presenting the at least one incoming message. Further, the provisioning of the at least one incoming message may be further based on the presenting.

Further, the at least one reader 1908 may include an electron microscope. Further, the reading may include a signal refraction architecture of an electron micrograph. Further, the at least one reader 1908 may be configured for reading one or more structures of one or more neuron pathways in a gold-embossed microtissue slide associated with the apparatus 1900. Further, the one or more structures of one or more neuron pathways in a gold-embossed microtissue slide may include a brain cell. Further, the processing device 1904 may be further configured for generating a unique authentication signature for the apparatus 1900 based on the reading. Further, the at least one authentication signature may include a gold embossed slide print of a micro-graphed structure of a freeze-dried microscopically sliced murine brain.

Further, the processing device 1904 may be further configured for appending the at least one outgoing message with the unique authentication signature based on the generating of the unique authentication signature. Further, the encoding of the at least one outgoing message may be further based on the appending.

Figure 30:
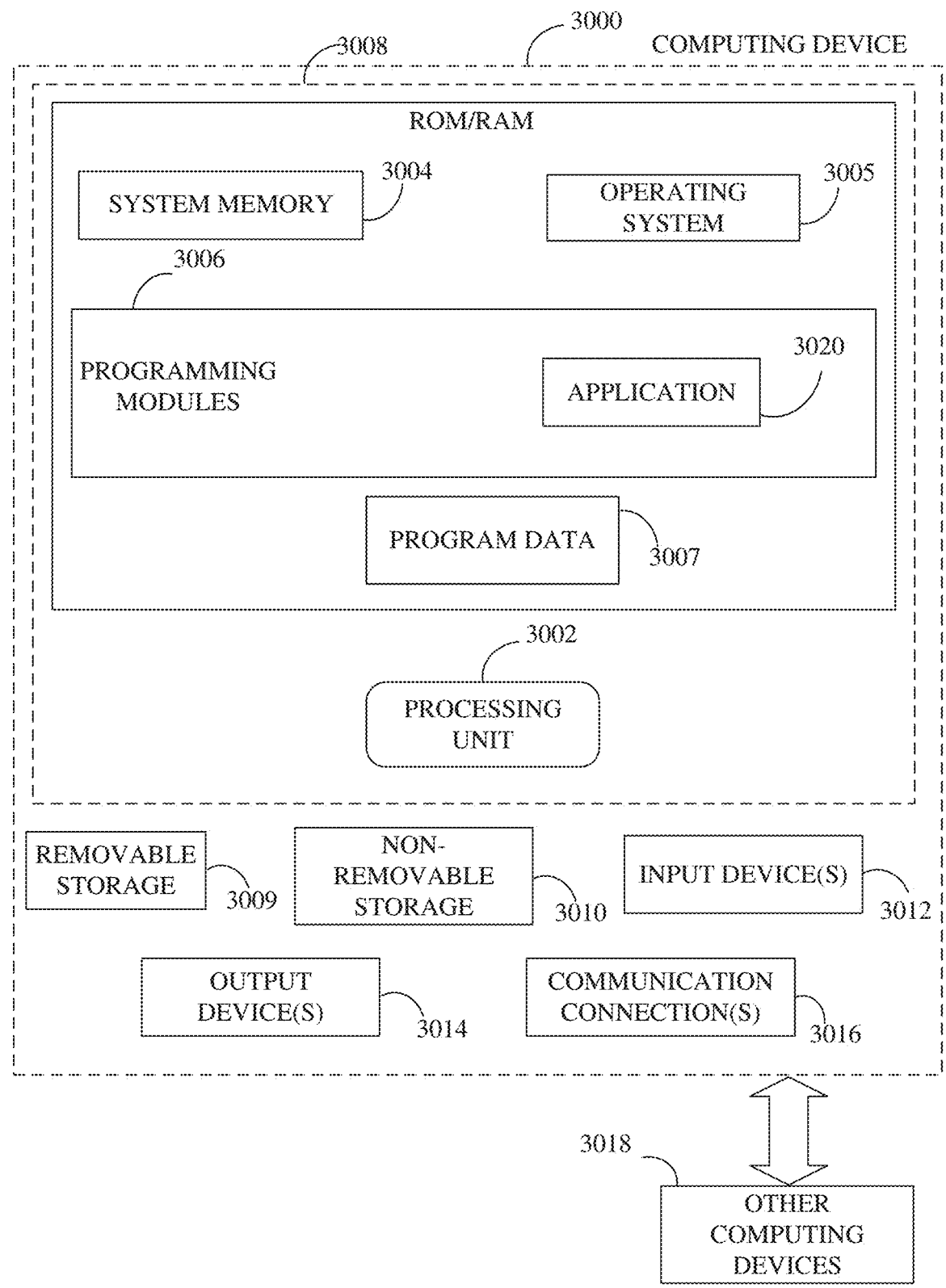
FIG. 30 is a block diagram of a computing device for implementing the methods disclosed herein, in accordance with some embodiments.

With reference to FIG. 30, a system consistent with an embodiment of the disclosure may include a computing device or cloud service, such as computing device 3000. In a basic configuration, computing device 3000 may include at least one processing unit 3002 and a system memory 3004. Depending on the configuration and type of computing device, system memory 3004 may comprise, but is not limited to, volatile (e.g. random-access memory (RAM)), non-volatile (e.g. read-only memory (ROM)), flash memory, or any combination. System memory 3004 may include operating system 3005, one or more programming modules 3006, and may include a program data 3007. Operating system 3005, for example, may be suitable for controlling computing device 3000's operation. In one embodiment, programming modules 3006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 30 by those components within a dashed line 3008.

Computing device 3000 may have additional features or functionality. For example, computing device 3000 may also include additional data storage devices (removable and/or non-removable) such as, for example, magnetic disks, optical disks, or tape. Such additional storage is illustrated in FIG. 30 by a removable storage 3009 and a non-removable storage 3010. Computer storage media may include volatile and non-volatile, removable and non-removable media implemented in any method or technology for storage of information, such as computer-readable instructions, data structures, program modules, or other data. System memory 3004, removable storage 3009, and non-removable storage 3010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3000. Any such computer storage media may be part of device 3000. Computing device 3000 may also have input device(s) 3012 such as a keyboard, a mouse, a pen, a sound input device, a touch input device, a location sensor, a camera, a biometric sensor, etc. Output device(s) 3014 such as a display, speakers, a printer, etc. may also be included. The aforementioned devices are examples and others may be used.

Computing device 3000 may also contain a communication connection 3016 that may allow device 3000 to communicate with other computing devices 3018, such as over a network in a distributed computing environment, for example, an intranet or the Internet. Communication connection 3016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3004, including operating system 3005. While executing on processing unit 3002, programming modules 3006 (e.g., application 3020 such as a media player) may perform processes including, for example, one or more stages of methods, algorithms, systems, applications, servers, databases as described above. The aforementioned process is an example, and processing unit 3002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 31:
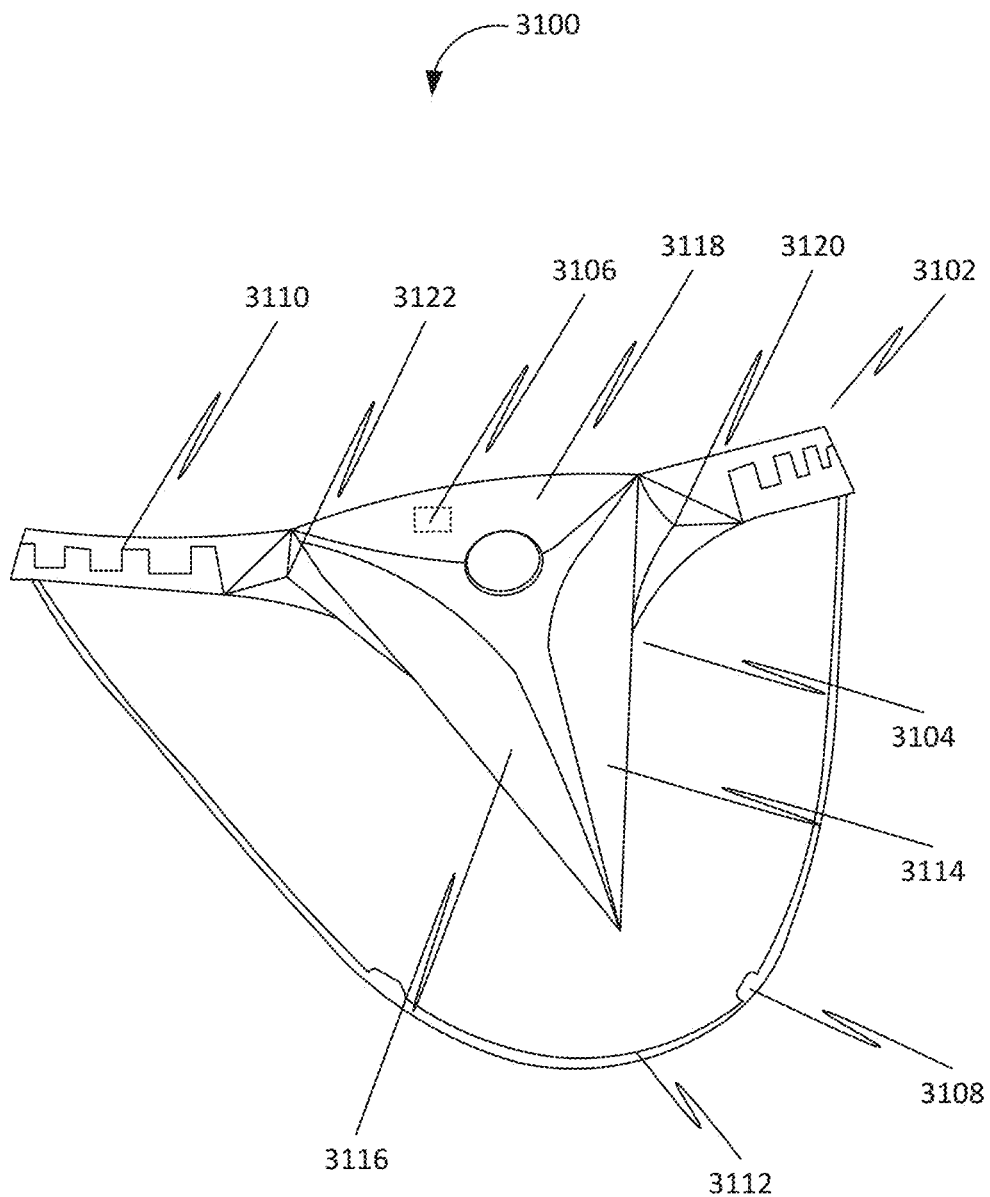
FIG. 31 is an illustration of an apparatus 3100 for facilitating light based communications, in accordance with some embodiments.

FIG. 31 is an illustration of an apparatus 3100 for facilitating light based communications, in accordance with some embodiments. Accordingly, the apparatus 3100 may include an apparatus body 3102, at least one transceiver 3104, a processing device 3106, and at least one sensor 3108.

Further, the apparatus body 3102 may be configured to be secured to at least a part of a body of at least one user. Further, the apparatus body 3102 may include the at least one transceiver 3104, the processing device 3106, and the at least one sensor 3108.

Further, the apparatus body 3102 may include a head band portion 3110 and a chin strap portion 3112 attached to the head band portion 3110. Further, the head band portion 3110 may be configured to be secured to a head of the at least one user and the chin strap portion 3112 may be configured to be secured around a face of the user. Further, the at least one transceiver 3104 may include a plurality of light emitters 3114-3118 and at least one light receiver 3120-3122. Further, the at least one transceiver 3104 may be disposed on the head band portion 3110 of the apparatus body 3102. Further, the plurality of light emitters 3114-3118 faces outwardly away from the head of the at least one user. Further, the at least one sensor 3108 may be comprised in the chin strap portion 3112 of the apparatus body 3102.

Although the present disclosure has been explained in relation to its preferred embodiment, it is to be understood that many other possible modifications and variations can be made without departing from the spirit and scope of the disclosure.

What is claimed is:

1. An apparatus for facilitating light based communications, the apparatus comprising:
    at least one transceiver comprising a plurality of light emitters and at least one light receiver, wherein the plurality of light emitters emits a plurality of light, wherein the at least one light receiver is configured for detecting at least one incoming light signal associated with at least one communication;
    a processing device operatively coupled with the at least one transceiver, wherein the processing device is configured for:
        generating at least one incoming coded message based on the detecting;
        decoding the at least one incoming coded message into at least one incoming message using at least one coding scheme;
        provisioning the at least one incoming message based on the decoding;
        obtaining at least one outgoing message associated with the at least one communication;
        encoding the at least one outgoing message using the at least one coding scheme based on the obtaining of the at least one outgoing message;
        generating at least one encoded outgoing message based on the encoding, wherein the at least one encoded outgoing message is comprised of a plurality of symbols; and
        generating at least one command for the at least one transceiver based on the generating of the at least one encoded outgoing message, wherein the at least one command comprises at least one sequence for activating at least one of the plurality of light emitters, wherein at least one of the plurality of light emitters is configured for emitting at least one outgoing light signal based on the at least one command; and
    at least one sensor communicatively coupled with the processing device, wherein the at least one sensor is configured for detecting at least one of a gesture, an expression, and a movement associated with at least one user, wherein the processing device is communicatively coupled with the at least one sensor, wherein the processing device is configured for:

generating at least one sensor data based on the detecting of at least one of the gesture, the expression, and the movement associated with the at least one user; and analyzing the at least one sensor data, wherein the obtaining of the at least one outgoing message is further based on the analyzing of the at least one sensor data.

2. The apparatus of claim 1 further comprising at least one user interface device communicatively coupled with the processing device, wherein the at least one user interface device is configured for generating the at least one outgoing message associated with the at least one communication, wherein the obtaining of the at least one outgoing message is based on the generating, wherein the at least one user interface device is further configured for presenting the at least one incoming message, wherein the provisioning of the at least one incoming message is further based on the presenting.

3. The apparatus of claim 1 further comprising an apparatus body configured to be secured to at least a part of a body of the at least one user, wherein the apparatus body comprises the at least one transceiver, the processing device, and the at least one sensor.

4. The apparatus of claim 3, wherein the apparatus body comprises a head band portion and a chin strap portion attached to the head band portion, wherein the head band portion is configured to be secured to a head of the at least one user and the chin strap portion is configured to be secured around a face of the user, wherein the plurality of light emitters of the at least one transceiver is disposed on the head band portion of the apparatus body, wherein the plurality of light emitters faces outwardly away from the head of the at least one user, wherein the at least one sensor is comprised in the chin strap portion of the apparatus body.

5. The apparatus of claim 1, wherein the plurality of light comprises a first light characterized by a first spectral range, a second light characterized by a second spectral range, and a third light characterized by a third spectral range, wherein the first spectral range, the second spectral range, and the third spectral range are distinct, wherein the plurality of light emitters comprises a first light emitter, a second light emitter, and a third light emitter, wherein the first light emitter emits the first light, the second light emitter emits the second light, and the third light emitter emits the third light.

6. The apparatus of claim 5, wherein the first spectral range, the second spectral range, and the third spectral range belong to a visible portion of the electromagnetic spectrum.

7. The apparatus of claim 5, wherein the first spectral range, the second spectral range, and the third spectral range belong to an infrared portion of the electromagnetic spectrum.

8. The apparatus of claim 1 further comprising at least one reader communicatively coupled with the processing device, wherein the at least one reader is configured for reading one or more structures of one or more neuron pathways in a gold-embossed microtissue slide associated with the apparatus, wherein the processing device is further configured for:

generating a unique authentication signature for the apparatus based on the reading; and
appending the at least one outgoing message with the unique authentication signature based on the generating of the unique authentication signature, wherein the encoding of the at least one outgoing message is further based on the appending.

9. The apparatus of claim 1, wherein the at least one communication is between the apparatus and at least one communication apparatus, wherein the at least one communication apparatus comprises at least one transceiver and a processing device operatively coupled with the at least one transceiver.

10. The apparatus of claim 9, wherein the at least one communication apparatus comprises at least one first communication apparatus and at least one second communication apparatus, wherein the at least one first communication apparatus communicates with the at least one second communication apparatus using at least one light signal for facilitating the at least one communication, wherein each of the at least one first communication apparatus and the at least one second communication apparatus comprises a time reference verification filter, wherein the time reference verification filter is configured for verifying one or more communications between the at least one first communication apparatus and the at least one second communication apparatus based on a predictable pattern of the at least one light signal.

11. The apparatus of claim 9, wherein the at least one communication apparatus comprises at least one Buckminsterfullerene glass crystal ball and at least one movement mechanism coupled with the at least one Buckminsterfullerene glass crystal ball, wherein the at least one movement mechanism is configured for rotating the at least one Buckminsterfullerene glass crystal ball, wherein the at least one Buckminsterfullerene glass crystal ball is associated with at least three rotational parameters based on the rotating, wherein the at least one Buckminsterfullerene glass crystal ball is configured for encrypting the at least one communication based on the at least three rotational parameters by transforming the at least one outgoing light signal to at least one outgoing communication light signal, wherein the at least one Buckminsterfullerene glass crystal ball is configured for decrypting the at least one communication based on the at least three rotational parameters by transforming at least one incoming communication light signal to the at least one incoming light signal.

12. An apparatus for facilitating light based communications, the apparatus comprising:

at least one transceiver comprising a plurality of light emitters and at least one light receiver, wherein the plurality of light emitters emits a plurality of light, wherein the at least one light receiver is configured for detecting at least one incoming light signal associated with at least one communication;

a processing device operatively coupled with the at least one transceiver, wherein the processing device is configured for:
generating at least one incoming coded message based on the detecting;
decoding the at least one incoming coded message into at least one incoming message using at least one coding scheme;
provisioning the at least one incoming message based on the decoding;
obtaining at least one outgoing message associated with the at least one communication;
encoding the at least one outgoing message using the at least one coding scheme based on the obtaining of the at least one outgoing message;
generating at least one encoded outgoing message based on the encoding, wherein the at least one encoded outgoing message is comprised of a plurality of symbols; and generating at least one command for the at least one transceiver based on the generating of the at least one encoded outgoing message, wherein the at least one command comprises at least one sequence for activating at least one of the plurality of light emitters, wherein at least one of the plurality of light emitters is configured for emitting at least one outgoing light signal based on the at least one command; and at least one user interface device communicatively coupled with the processing device, wherein the at least one user interface device is configured for generating the at least one outgoing message associated with the at least one communication, wherein the obtaining of the at least one outgoing message is based on the generating, wherein the at least one user interface device is further configured for presenting the at least one incoming message, wherein the provisioning of the at least one incoming message is further based on the presenting;

at least one sensor communicatively coupled with the processing device, wherein the at least one sensor is configured for detecting at least one of a gesture, an expression, and a movement associated with at least one user, wherein the processing device is configured for:

generating at least one sensor data based on the detecting of at least one of the gesture, the expression, and the movement of the at least one user; and analyzing the at least one sensor data, wherein the obtaining of the at least one outgoing message is further based on the analyzing of the at least one sensor data; and an apparatus body configured to be secured to at least a part of a body of the at least one user, wherein the apparatus body comprises the at least one transceiver, the processing device, and the at least one sensor.

13. The apparatus of claim 12, wherein the apparatus body comprises a head band portion and a chin strap portion attached to the head band portion, wherein the head band portion is configured to be secured to a head of the at least one user and the chin strap portion is configured to be secured around a face of the user, wherein the plurality of light emitters of the at least one transceiver is disposed on the head band portion of the apparatus body, wherein the plurality of light emitters faces outwardly away from the head of the at least one user, wherein the at least one sensor is comprised in the chin strap portion of the apparatus body.

14. The apparatus of claim 12, wherein the plurality of light comprises a first light characterized by a first spectral range, a second light characterized by a second spectral range, and a third light characterized by a third spectral range, wherein the first spectral range, the second spectral range, and the third spectral range are distinct, wherein the plurality of light emitters comprises a first light emitter, a second light emitter, and a third light emitter, wherein the first light emitter emits the first light, the second light emitter emits the second light, and the third light emitter emits the third light.

15. The apparatus of claim 14, wherein the first spectral range, the second spectral range, and the third spectral range belong to a visible portion of the electromagnetic spectrum.

16. The apparatus of claim 14, wherein the first spectral range, the second spectral range, and the third spectral range belong to an infrared portion of the electromagnetic spectrum.

17. An apparatus for facilitating light based communications, the apparatus comprising:

at least one transceiver comprising a plurality of light emitters and at least one light receiver, wherein the plurality of light emitters emits a plurality of light, wherein the at least one light receiver is configured for detecting at least one incoming light signal associated with at least one communication;

a processing device operatively coupled with the at least one transceiver, wherein the processing device is configured for:

generating at least one incoming coded message based on the detecting;

decoding the at least one incoming coded message into at least one incoming message using at least one coding scheme;

provisioning the at least one incoming message based on the decoding;

obtaining at least one outgoing message associated with the at least one communication;

encoding the at least one outgoing message using the at least one coding scheme based on the determining of the at least one outgoing message;

generating at least one encoded outgoing message based on the encoding, wherein the at least one encoded message is comprised of a plurality of symbols; and generating at least one command for the at least one transceiver based on the generating of the at least one encoded outgoing message, wherein the at least one command comprises at least one sequence for activating at least one of the plurality of light emitters, wherein at least one of the plurality of light emitters is configured for emitting at least one outgoing light signal based on the at least one command;

at least one user interface device communicatively coupled with the processing device, wherein the at least one user interface device is configured for generating the at least one outgoing message associated with the at least one communication, wherein the obtaining of the at least one outgoing message is based on the generating, wherein the at least one user interface device is further configured for presenting the at least one incoming message, wherein the provisioning of the at least one incoming message is further based on the presenting; and at least one reader configured for reading one or more structures of one or more neuron pathways in a gold-embossed microtissue slide associated with the apparatus, wherein the processing device is further configured for:

generating a unique authentication signature for the apparatus based on the reading; and appending the at least one outgoing message with the unique authentication signature based on the generating of the unique authentication signature, wherein the encoding of the at least one outgoing message is further based on the appending.

* * * * *